US012767377B2

(12) United States Patent
Singh

(10) Patent No.: US 12,767,377 B2
(45) Date of Patent: Oct. 20, 2026

(54) ARTIFICIAL INTELLIGENCE (AI) BASED SELF-LABELLING SYSTEM AND METHOD THEREOF

(71) Applicant: SKYLARK LABS INC., Bethel, CT (US)

(72) Inventor: Amarjot Singh, Bethel, CT (US)

(73) Assignee: SKYLARK LABS INC.

( * ) Notice: Subject to any disclaimer, the term of this patent is extended or adjusted under 35 U.S.C. 154(b) by 268 days.

(21) Appl. No.: 18/622,947

(22) Filed: Mar. 31, 2024

(65) Prior Publication Data

US 2025/0304306 A1 Oct. 2, 2025

(51) Int. Cl.

| | |
|---|---|
| ***B65C 9/26*** | (2006.01) |
| ***G06N 20/20*** | (2019.01) |
| ***G06V 10/764*** | (2022.01) |

(52) U.S. Cl.
CPC ............... *B65C 9/26* (2013.01); *G06N 20/20* (2019.01); *G06V 10/764* (2022.01)

(58) Field of Classification Search
CPC .......... B65C 9/26; G06N 20/20; G06N 20/00; G06V 10/764
See application file for complete search history.

(56) References Cited

U.S. PATENT DOCUMENTS

| | | | | |
|---|---|---|---|---|
| 9,965,704 | B2 * | 5/2018 | Zhou | G06F 16/583 |
| 10,721,264 | B1 | 7/2020 | Dell'Amico et al. | |
| 2015/0019460 | A1 * | 1/2015 | Simard | G06F 40/30<br>706/11 |
| 2017/0109582 | A1 * | 4/2017 | Kuznetsova | G06V 10/255 |
| 2020/0034752 | A1 | 1/2020 | Luo et al. | |
| 2021/0303929 | A1 * | 9/2021 | Bhogal | G06F 18/2148 |
| 2023/0111765 | A1 * | 4/2023 | Sheng Tang | G06F 18/2155<br>382/155 |
| 2023/0342428 | A1 * | 10/2023 | Kramer | G06N 3/088 |

FOREIGN PATENT DOCUMENTS

| | | |
|---|---|---|
| WO | 2022087510 A1 | 4/2022 |

OTHER PUBLICATIONS

Hongyu Liu, Bo Lang; Machine Learning and Deep Learning Methods for Intrusion Detection Systems: A Survey; Oct. 17, 2019; vol. 9, Issue 20; MDPI; China.

* cited by examiner

*Primary Examiner* — Bobbak Safaipour
(74) *Attorney, Agent, or Firm* — Kendal M. Sheets

(57) ABSTRACT

The disclosure relates to an Artificial Intelligence (AI) based self-labelling method and system. The AI based self-labelling method includes creating, in real-time, image vectors from multimedia content captured via a camera; identifying a set of image vectors associated with at least one predefined category of interest from the image vectors by a trained AI model; assigning at least one dimension to each of the set of image vectors; determining by the trained AI model, for a subset of image vectors within the set of image vectors, the availability of at least one relevant label from a plurality of pre-created labels; receiving a user input for assigning a new label to the subset of image vectors, in response to determining non-availability of a relevant label from the plurality of pre-created labels; performing incremental learning based on the new label received from the user by the trained AI model.

18 Claims, 11 Drawing Sheets

ARTIFICIAL INTELLIGENCE (AI) BASED SELF-LABELLING SYSTEM AND METHOD THEREOF

TECHNICAL FIELD

The present disclosure relates generally to Artificial Intelligence (AI), and more particularly to AI based self-labelling system and method.

Background

In various industries including security surveillance, environmental monitoring, and object detection, in order to train and subsequently perform incremental learning for Artificial Intelligence (AI) models, accurate labelling of multimedia content, particularly images, is crucial, in order to perform effective analysis and decision-making. Conventionally, labelling is exclusively performed manually, requiring human annotators to accurately categorize images into predefined classes or categories. However, the manual approach of labelling is labor-intensive, time-consuming, and often prone to inconsistencies and errors, especially when dealing with large datasets. Limitations of manual labelling have become increasingly apparent with the proliferation of multimedia content captured through cameras and other sensors in various domains. The volume and complexity of visual data generated pose significant challenges for efficient and accurate labelling. Additionally, the dynamic nature of certain applications, such as the security surveillance and the object detection, demands real-time analysis and classification capabilities that manual methods struggle to fulfill.

Additionally, conventional labelling systems, reliant on manual annotation methods, encounter substantial limitations when confronted with new environments and unfamiliar objects. This manual nature of these systems renders them inadequately prepared to adapt rapidly to evolving scenarios, resulting in inefficiencies and inaccuracies when attempting to categorize new threats or the objects encountered in open environments. Moreover, inherent subjectivity and variability inherent in human labelling processes exacerbate challenges posed by unforeseen circumstances, further impeding system's ability to effectively identify and classify emerging threats. Conversely, while AI demonstrates proficiency in automating labelling processes, they confront inherent challenges when confronted with novel threats and environments. Though conventional AI algorithms are adept at recognizing patterns and categorizing known entities, these often encounter difficulties discerning and classifying previously unseen threats. In open environments, conventional AI systems struggle due to the presence of numerous unpredictable variables.

Therefore, there is a need to improve the adaptability and robustness of AI-driven threat detection, labelling and classification mechanisms in order to address these challenges.

SUMMARY

In one embodiment, an Artificial Intelligence (AI) based self-labelling method is disclosed. In one example, the AI based self-labelling method may include creating, in real-time, image vectors from multimedia content captured via a camera. The AI based self-labelling method may further include identifying, by a trained AI model, a set of image vectors associated with at least one predefined category of interest from the image vectors. The AI based self-labelling method may further include assigning at least one dimension to each of the set of image vectors. It should be noted that the at least one dimension may include a frequency dimension, a recency dimension, and a pattern dimension. The recency dimension may correspond to time-based proximity with a timestamp associated with the multimedia content The AI based self-labelling method may further include determining, by the trained AI model, for a subset of image vectors within the set of image vectors, the availability of at least one relevant label from a plurality of pre-created labels, based on the at least one assigned dimension and associated attributes. The AI based self-labelling method may further include receiving a user input for assigning a new label to the subset of image vectors, in response to determining non-availability of a relevant label from the plurality of pre-created labels. The AI based self-labelling method may further include performing, by the trained AI model, incremental learning based on the new label received from the user.

In another embodiment, an Artificial Intelligence (AI) based self-labelling system is disclosed. In one example, the AI based self-labelling system may include a processor and a memory communicatively coupled to the processor. The memory may store processor-executable instructions, which, on execution, may cause the processor to create, in real-time, image vectors from multimedia content captured via a camera. The processor-executable instructions, on execution, may further cause the processor to identify, by a trained AI model, a set of image vectors associated with at least one predefined category of interest from the image vectors. The processor-executable instructions, on execution, may further cause the processor to assign at least one dimension to each of the set of image vectors. It should be noted that the at least one dimension may include a frequency dimension, a recency dimension, and a pattern dimension. The recency dimension may correspond to time-based proximity with a timestamp associated with the multimedia content. The processor-executable instructions, on execution, may further cause the processor to determine, by the trained AI model, for a subset of image vectors within the set of image vectors, the availability of at least one relevant label from a plurality of pre-created labels, based on the at least one assigned dimension and associated attributes. The processor-executable instructions, on execution, may further cause the processor to receive a user input to assign a new label to the subset of image vectors, in response to determining non-availability of a relevant label from the plurality of pre-created labels. The processor-executable instructions, on execution, may further cause the processor to perform, by the trained AI model, incremental learning based on the new label received from the user.

In yet another embodiment, a non-transitory computer-readable medium storing computer-executable instruction for Artificial Intelligence (AI) based self-labelling is disclosed. The stored instructions, when executed by a processor, may cause the processor to perform operations including creating, in real-time, image vectors from multimedia content captured via a camera. The operations may further include identifying, by a trained AI model, a set of image vectors associated with at least one predefined category of interest from the image vectors. The operations may further include assigning at least one dimension to each of the set of image vectors. It should be noted that the at least one dimension may include a frequency dimension, a recency dimension, and a pattern dimension. The recency dimension may correspond to time-based proximity with a timestamp associated with the multimedia content. The operations may further include determining, by the trained AI model, for a subset of image vectors within the set of image vectors, the availability of at least one relevant label from a plurality of pre-created labels, based on the at least one assigned dimension and associated attributes. The operations may further include receiving a user input n for assigning a new label to the subset of image vectors, in response to determining non-availability of a relevant label from the plurality of pre-created labels. The operations may further include performing, by the trained AI model, incremental learning based on the new label received from the user.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described h reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
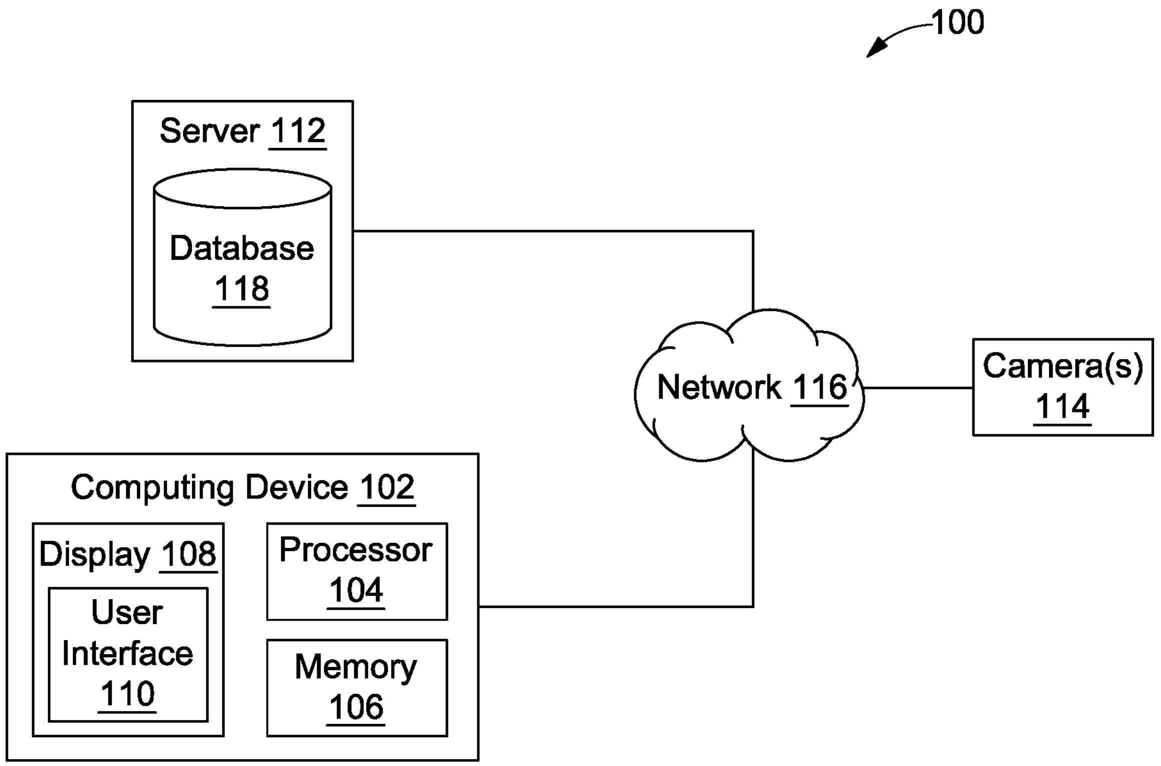
FIG. 1 illustrates an exemplary environment in which various embodiments may be employed.

An exemplary environment 100 in which various embodiments may be employed, is illustrated in FIG. 1. The environment 100 includes a computing device 102. The computing device 102 may perform self-labelling using an Artificial Intelligence (AI) model (not shown in FIG. 1). For example, for self-labelling, the computing device 102 may perform various functions including creation of image vectors, identification of a set of image vectors of a category of interest from the created image vectors, dimension assignment to the identified set of image vectors, determination of availability of relevant labels, receiving user selections, and the like. This is further explained in detail in conjunction with FIGS. 2-11. Examples of the computing device 102 may include, but are not limited to, a server, a desktop, a laptop, a notebook, a tablet, a smartphone, a mobile phone, an application server, or the like. The computing device 102 may further include a processor 104 and a memory 106.

The processor 104 may include suitable logic, circuitry, interfaces, and/or code that may be configured to perform self-labelling. The processor 104 may be implemented based on a number of processor technologies, which may be known to one ordinarily skilled in the art. Examples of implementations of the processor 104 may include a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, Artificial Intelligence (AI) accelerator chips, a co-processor, a central processing unit (CPU), and/or a combination thereof.

The memory 106 may store various data (for example, image vectors, multimedia content, pre-created labels, assigned dimensions, AI model, new labels, and the like) that may be captured, processed, and/or required by the computing device 102. The memory 106 may be a non-volatile memory or a volatile memory. Examples of non-volatile memory may include, but are not limited to, a flash memory, a Read-Only Memory (ROM), a Programmable ROM (PROM), Erasable PROM (EPROM), and Electrically EPROM (EEPROM) memory. Examples of volatile memory may include, but are not limited to, Dynamic Random-Access Memory (DRAM), and Static Random-Access memory (SRAM). The memory 106 may also store various data that may be captured, processed, and/or required by the system 100.

The memory 106 may store instructions that, when executed by the processor 104, may cause the processor 104 to perform self-labelling, in accordance with some embodiments. As will be described in greater detail in conjunction with FIG. 2 to FIG. 11, in order to perform self-labelling, the processor 104 in conjunction with the memory 106 may perform various functions including receiving multimedia content, creating image vectors, identifying image vectors with a predefined category of interest, assigning dimensions to the image vectors, determining availability and non-availability of a relevant label, receiving user selections/inputs, and the like. The predefined category of interest encompasses a wide range of applications, including but not limited to, threat detection, reconnaissance, environmental monitoring, and the like.

The computing device 102 may also include a display 108. The display 108 may further include a user interface 110. A user, or an administrator may interact with the computing 102 and vice versa through the display 108. By way of an example, the display 108 may be used to display results of analysis (i.e., the multimedia content, the dimensions, the availability of relevant labels, the user interaction options, etc.) performed by the computing device 102, to the user or the administrator. By way of another example, the user interface 110 may be used by the user or the administrator to provide inputs to the computing device 102. Thus, for example, in some embodiments, the computing device 102 may receive input from the user or the administrator to assign new labels in response to determining non-availability of relevant labels. Further, for example, in some embodiments, the computing device 102 may render results to the user/administrator via the user interface 110.

In some embodiments, the computing device 102 may include a computer system such as a desktop computer, notebook or laptop computer, netbook, a tablet computer, an e-book reader, a GPS device, a camera, a personal digital assistant (PDA), a handheld electronic device, a cellular telephone, a smartphone, an augmented/virtual reality device, another suitable electronic device, or any suitable combination thereof and may also include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR.

In some embodiments, the computing device 102 may further communicate with a server 112 or camera(s) 114 via a network 116 for sending and receiving various data (for example, for receiving multimedia content corresponding to an event). The network 116 may correspond to a communication network that may include a communication medium through which the computing device 102 may communicate with other devices or databases. Examples of the communication network may include, but are not limited to, Internet, a cloud network, a Wireless Fidelity (Wi-Fi) network, a Personal Area Network (PAN), a Local Area Network (LAN), or a Metropolitan Area Network (MAN).

Various devices in the environment 100 may be configured to connect to the network 116, in accordance with various wired and wireless communication protocols. Examples of such wired and wireless communication protocols may include, but are not limited to, a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

By way of an example, in some embodiments, the computing device 102 may receive information from the server 112 or the camera(s) 114. The server 112 may further include a database 118, which may store information such as the multimedia content, the pre-created labels, the AI model, etc. The camera(s) 114 may capture the multimedia content that may be processed to the server 112 or the computing device 102 as required. Further, the camera(s) 114 may be, but are not limited to, a digital camera, an analog camera, a smartphone camera, an action camera, a webcam, a security camera, a film camera, an aerial camera (for example, a drone camera), a medical camera, a hybrid camera, and the like. It should be noted that in some embodiments, the computing device 102 may be integrated in the camera(s) 114.

The computing device 102 performs an AI based self-labelling upon receiving the multimedia content captured via the camera(s) 114 employing real-time image vector creation and trained AI models for identification and categorization. The computing device 102 determines the availability of relevant labels from the pre-created labels based on assigned dimensions and allows users to assign new labels if necessary, prompting incremental learning by the AI models. It should be noted that the computing device 102 supports multi-tiered label hierarchies and incorporates merging mechanisms for new labels into the existing hierarchical classification, enhancing scalability and adaptability.

Figure 2:
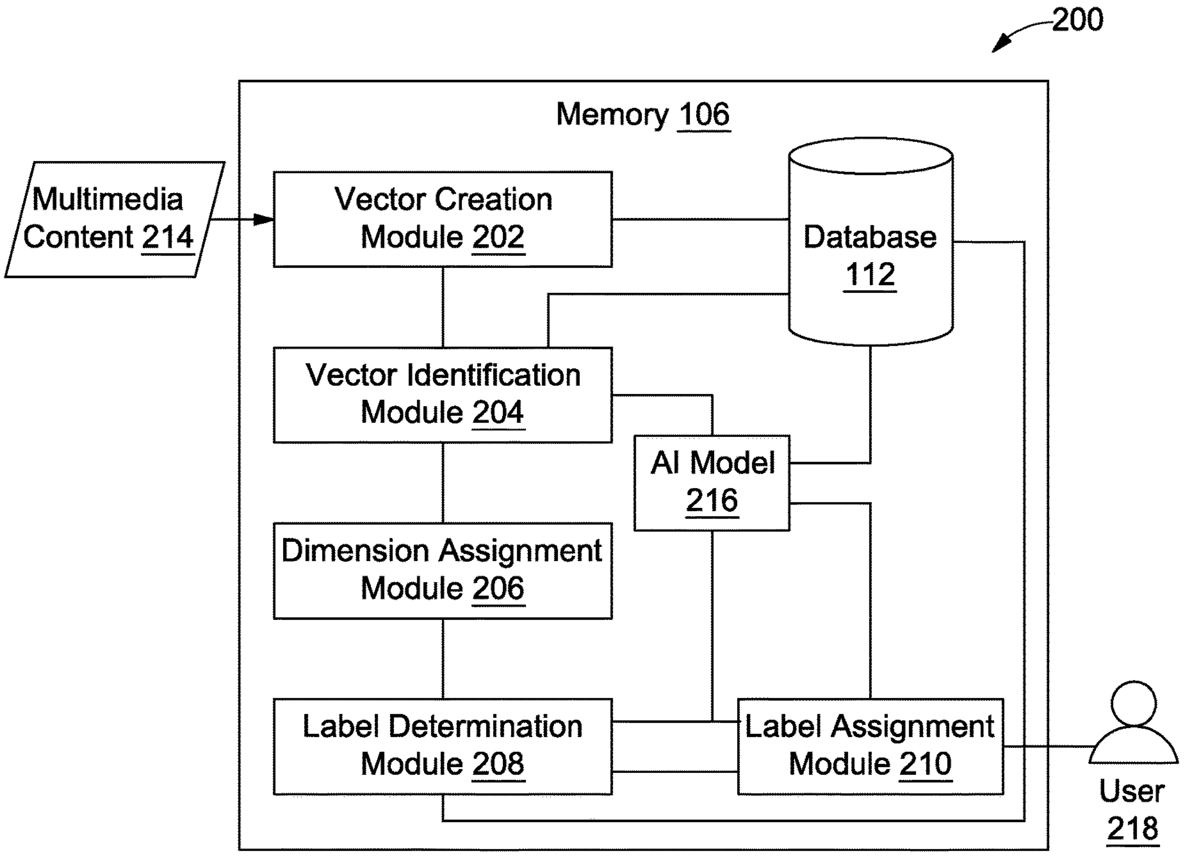
FIG. 2 is a functional block diagram of various modules within a memory of a computing device configured for Artificial Intelligence (AI) based self-labelling, in accordance with some embodiments of the present disclosure.

Referring now to FIG. 2, a functional block diagram 200 of various modules within the memory 106 of the computing device 102 configured to perform AI based self-labelling is illustrated, in accordance with some embodiments of the present disclosure. FIG. 2 is explained in conjunction with FIG. 1. As illustrated in FIG. 2, the memory 106 may include a vector creation module 202, a vector identification module 204, a dimension assignment module 206, a label determination module 208, and a label assignment module 210. Also, the memory 106 may include a database 212 for storing various data or intermediate results generated through the modules 202-210.

The vector creation module 202 may be configured to receive multimedia content 214. The multimedia content 214 may be captured via one or more cameras (for example, the camera(s) 114). The multimedia content 214 may include, but is not limited to, images, videos, or any other visual data captured by the one or more cameras. For example, in a surveillance system, the multimedia content 214 may be a footage from security cameras monitoring a facility. Further, in some embodiments, the vector creation module 202 may create image vectors, in real-time, from the received multimedia content 214. The image vectors represent key attributes of the multimedia content 214. For example, in the case of images, the image vectors may represent pixel values, color histograms, texture features, or other image descriptors.

By way of an example, consider a scenario where the multimedia content 214 includes images captured by a traffic monitoring camera. The vector creation module 202 may analyze each image to extract features such as vehicle shapes, vehicle color, and vehicle positions. Further, these features may be converted into image vectors. For example, an image vector representing a red car traveling at a certain speed in a specific lane may capture attributes such as color intensity, vehicle size, and direction of motion. The vector creation module 202 may employ various feature extraction techniques to capture relevant information from the multimedia content 214. The techniques may include, but are not limited to, image processing algorithms, computer vision methods, machine learning models, or a combination thereof. For example, in the case of video surveillance, the vector creation module 202 may use an object detection algorithm to identify and track moving objects in video frames, generating image vectors representing spatial and temporal characteristics of objects. The vector creation module 202 may be communicatively coupled to the vector identification module 204.

The vector identification module 204 may identify a set of image vectors associated with at least one predefined category of interest from the image vectors using an Artificial Intelligence (AI) model 216. The AI model 216 may correspond to a trained AI model. The AI model 216 may be a single AI model or an ensembled AI model. It should be noted that the predefined category of interest may include, but is not limited to, a threat, debris, reconnaissance, surveillance, intrusion detection, intrusion elimination, unknown object detection, suspicious object detection swarm detection, payload analysis, accident investigation, anti-drone measures, environment monitoring, traffic monitoring, wildfire monitoring, flood monitoring, oil spill monitoring, urban planning, weapon detection, violence detection, agricultural monitoring, vessel classification, border monitoring, illegal activity detection, and danger. For example, the category of interest may be military air objects requiring detection and classification of military aircraft, including jets and helicopters, to monitor airspace activity and maintain national security. The category of interest may be suspicious drones that require identification of drones that may be operating in restricted or sensitive areas, potentially posing security risks or privacy violations. The category of interest may be large drones requiring tracking and monitoring large drones, which are capable of carrying heavier payloads and may be used for commercial, surveillance, or military purposes.

Further, the category of interest may be unknown objects requiring detection and identification of unclassified or unidentified aerial objects using advanced sensors and algorithms, ensuring rapid response to potential aerial threats. The category of interest may be air traffic monitoring that includes overseeing and managing movement of aircraft within a specified airspace to ensure safe navigation and prevent collisions or airspace violations. The category of interest may be swarm detection that includes identification and analyzation of clusters of drones or Unmanned Aerial Vehicles (UAVs) operating collectively, potentially posing security or privacy risks. The category of interest may be payload analysis focusing on identification and evaluation of cargo or equipment transported by aerial vehicles, vital for security measures and regulatory adherence. The category of interest may be aerial accident investigation that includes utilization of aerial reconnaissance to collect data and analyze factors contributing to air accidents, facilitating rescue efforts, and enhancing aviation safety standards. Further, the category of interest may be anti-drone measures that includes utilization of counter-drone technologies to detect, track, and potentially neutralize unauthorized or hostile drones in sensitive or restricted areas. The category of interest may be border surveillance that deploys aerial surveillance technologies to monitor national borders, identifying illegal crossings, smuggling activities, and other security breaches. Additionally, the category of interest may be environmental monitoring, infrastructure inspection, search and rescue operations, and the like.

By way of an example, consider a smart city initiative aimed at enhancing urban safety and security through use of surveillance cameras equipped with advanced image processing capabilities. The surveillance cameras are strategically placed across the city to monitor various aspects of public safety, traffic management, and environmental conditions. Initially, the surveillance cameras may capture multimedia content (for example the multimedia content 214) in a form of video streams depicting different scenes and activities within the city. Further, the vector creation module 202 may process the multimedia content, extracting key features and converting them into image vectors. For example, the vector creation module 202 may extract features such as vehicle types, pedestrian movements, object shapes, and environmental conditions from video frames. Further, the vector identification module 204 may identify a set of image vectors with a pre-defined category of interest from the created image vectors. In one example, the category of interest may be suspicious individuals, unattended bags, unauthorized access to restricted areas, and the like. In one example, the category of interest may be traffic congestion, violation of traffic rules, and the like. In one example, the category of interest may be air pollution, noise pollution, hazardous waste spills and the like. In one example, the category of interest may be unauthorized intrusions into secure premises or restricted zones. In one example, the category of interest may be natural disasters such as wildfires, floods, or earthquakes. The vector identification module 204 may be communicatively coupled to the dimension assignment module 206.

The dimension assignment module 206 may assign at least one dimension to each of the set of image vectors. The at least one dimension may include a frequency dimension, a recency dimension, and a pattern dimension. The frequency dimension may correspond to frequency of occurrence of an event, a behavior, or an activity captured within the set of image vectors. This is a measure of how often a specific event, behavior, activity, or feature appears in the set of image vectors. For example, in one embodiment, surveillance cameras may record instances of vehicles or individuals moving in proximity to a border fence during nighttime hours, indicating potential illegal activity. Each instance contributes to the frequency dimension, helping border security officials to identify hotspots or patterns of the illegal activity. The pattern dimension may correspond to a sequence of occurrences. For example, the pattern dimension may include identifying recurring patterns of behavior, activities, or events that may indicate the illegal activity or suspicious behavior. The recency dimension may correspond to time-based proximity with a timestamp associated with the multimedia content. The recency dimension may indicate time passed since the illegal activity occurred. It should be noted that recent incidents may have higher recency dimension values. The dimension assignment module 206 may be communicatively coupled to the label determination module 208.

The label determination module 208 in conjunction with the AI model 216 may determine the availability of a relevant label from a plurality of pre-created labels based on the assigned at least one dimension and associated attributes. The plurality of pre-created labels may be stored in a database associated with the AI model 216 (such as the database 112) and assigned to historical image vectors. It should be noted that each of the plurality of pre-created labels may include a multi-tiered hierarchy of child labels. The plurality of pre-created labels may correspond to parent labels. In other words, each parent label may have multiple child labels associated with it, forming a hierarchical structure that allows for granular classification. For example, in case of a border security system, the pre-created labels may be a "security threat", a "border incident", a "surveillance activity", and the like. The child labels may be subcategories that fall under the parent labels, providing more specific classifications, for example, for the parent label "security threat", the child labels may include various types of security risks and incidents along the border such as "illegal crossings", "smuggling activities", "potential terrorist threats", and the like. Further, the parent label "border incidents" may cover a broad range of incidents and events occurring at the border, such as "security breaches", "territorial violations", and "diplomatic incidents". The parent label "surveillance activity" may cover activities related to monitoring and surveillance operations conducted by border security agencies, including reconnaissance missions, and intelligence gathering.

To determine the availability, the assigned at least one dimension and the associated attributes for the subset of image vectors may be compared with dimensions and attributes of each of the plurality of pre-created labels. Further, the relevant label from the plurality of pre-created labels matching the one or more assigned dimensions and associated attributes for the subset of image vectors may be identified. In some embodiments, a similarity score of the subset of image vectors with respect to the historical image vectors may be determined. Further, it may be checked if the similarity score is above a pre-defined threshold. In case the similarity score is above or equal to the predefined threshold, the label determination module 208 may analyze correspondence between specific portions of the subset of image vectors and segments within the historical image vectors. Alternatively, in case the similarity score is below the pre-defined threshold, a human-in-the-loop (HITL) approach may be employed.

The label assignment module 210 in conjunction with the AI model 216 may assign the relevant label to the subset of the image vectors upon determining the availability of the relevant label. Further, when the similarity score is above or equal to the pre-defined threshold, and some features of the subset of image vectors are similar to existing features if the historical image vectors, then the AI model 216 may self-assign a new label closely aligned with the common features. For example, if the common features indicate an existing category or a pre-created label such as "firearm", the new label closely aligned may be a particular type of gun, such as a pistol or a rifle. Further, in case the relevant label is not available or in case of non-availability of the relevant label, the label assignment module 210 may receive an input from a user 218. The input may be a user selection of a new label. In such a case, the new label received from the user 218 may be assigned to the subset of the image vectors. In some embodiments, when the similarity score is below the pre-defined threshold, the label assignment module 210 may guide the user 218 by providing information about the common features or similarities between the subset of image vectors and the historical image vectors. This guidance may help the user 218 to choose an appropriate label based on the common features. For example, if the label determination module 208 detects similarities to both "handgun" and "shotgun" categories, information about these similarities may be presented to the user 218, along with specific features that match each pre-created label. The user 218 may then make an informed decision on how to label the subset of image vectors, such as creating the new label that combines aspects of both "handgun" and "shotgun".

Further, the AI model 216 may perform incremental learning based on the new label. To perform the incremental learning, a similarity index for the new label relative to at least one of the plurality of pre-created labels may be determined. Further, in some embodiments, the new label may be merged with a pre-created label from the plurality of pre-created labels. It should be noted that the similarity index of the pre-created label relative to the new label may be the highest. In one embodiment, the new label may be added as a child label of the pre-created label while merging with the new label. By way of an example, consider a scenario where the procreated "apparel", "accessories", "eyewear", and "headwear". Further, the new label provided by the user refers to "sunglasses". In such a case, the new label "sunglasses" has the highest similarity with the pre-created label "eyewear". Thus, the AI model 216 may choose to merge the new label "sunglasses" label with the pre-created label "eyewear".

Alternatively, in another embodiment, the new label may be combined with the pre-created label to create an updated label while merging with the new label. By way of an example, consider that the similarity index between the pre-created label "satellite communication" and the new label "channel coding" is highest. In such a case, instead of merely categorizing "channel coding" as a subset of "satellite communication", the AI model 216 may combine the "channel coding" with the "satellite communication" to create an updated label, such as "satellite communication with channel coding".

In short, when a new instance within the set of image vectors is encountered, initially a degree of similarity between the new instance and historical image vectors may be evaluated. This evaluation may be based on a comparison of feature vectors, which represent characteristics of the multimedia content 214. The AI model 216 may calculate a similarity, to determine how closely the new instance aligns with one or more of the plurality of pre-created labels. If the similarity crosses the predefined threshold, the AI model 216 may automatically suggest that the new instance may belong to a specific pre-created label or its subcategory. Further, the AI model 216 may analyze which parts of the set of image vectors match those of the plurality of pre-created labels (i.e., existing categories). This detailed comparison helps in understanding common characteristics between the new instance and the existing categories. Based on this matching, the AI model 216 may suggest that the new instance may be labeled as a new subcategory closely aligned with a known category, such as specifying a type of dog or a type of cat if a main category is "animals". Further, the AI model 216 may present its findings and suggestions to the user 218 (i.e., a human operator), highlighting the similarity and the common features. This information may help guiding the user 218 in making the informed decision about the new label. The user 218 may then either confirm the suggestion of the AI model 216, thus creating a new subcategory label, or provide a different new label based on their assessment. This step ensures incorporation of human assessment, especially in complex cases where nuanced understanding is crucial. Once the new label is assigned, a knowledge base or the database 112 may be updated with this information. The AI model 216 may learn from this human-verified decision, improving its future suggestions for both automated labeling and HITL interactions. Over time, this process may minimize a need for human intervention as the AI model 216 may become more adept at identifying similarities and making accurate label suggestions.

In some embodiments, the pattern dimension may be prioritized for initial analysis. Further, the other dimensions such as the frequency dimension and the recency dimension may be considered for further validation. Initially, patterns may be considered when analyzing data. By identifying these patterns first, further validation may be performed by considering other aspects like how often these patterns occur and how recent they are. This ensures that the analysis is thorough and reliable, setting a standard for effective data examination in various industries. In other words, the analysis may begin by matching patterns, focusing on identifying key parts of objects. For example, in case of a blurry image of a face, the key parts may be eyes, nose, ears, and the like. Once the patterns are recognized, other dimensions such as frequency and recency may be considered to validate the identification. It should be noted that pattern matching is the primary criterion for labeling, in accordance with some embodiments of the invention.

In some embodiments, potential threats determined based on labelling may be presented on a display (such as the display 108) of user interface (such as a dashboard), enabling security analysts or administrators to manually review and assess suspicious activities. The user interface may be configured to highlight anomalies, flag unusual behaviors, and prioritize threats based on a predefined criteria such as a frequency, a recency, and a severity. For example, the dashboard may visually distinguish between different types of threats such as network intrusions, malware detections, and suspicious user activities using color coding, icons, or any other differentiating technique. Further, the analysts or administrators may click on each item associated with a threat to get detailed information about the threat including, but not limited to, a source, a target, a behavior pattern, and any related incidents. This aspect may facilitate immediate awareness and understanding of potential threats, empowering users/the analysts/the administrators to make informed decisions on further investigation or take direct mitigation actions.

Further, in some embodiments, new threats may be labelled manually by the analysts, leveraging the information provided on the dashboard, to categorize each threat accurately. This process may include a thorough analysis of threat's characteristics, such as the frequency, the recency, behavioral patterns, and an impact. The analysts may label a detected anomaly as "Unauthorized Access Attempt" after reviewing login attempt logs and identifying patterns that deviate from a normal user behavior. This manual intervention may allow for application of human expertise and contextual understanding, ensuring that each threat may be labeled with a level of precision and insight that automated systems may not achieve. This manual intervention may also enable incorporation of nuanced threat categories that reflect specific security policies and risk tolerance of an organization.

In some embodiments, contextual analysis may be performed for dynamic labelling. In this approach, a broader context in which a threat occurs may be considered including network environment, targeted systems, and potential impact. Analyzation of these factors may allow for assignment of more specific and informative labels. For example, "Insider Threat: Data Leak" may be assigned to suspicious activities within an organization suggesting an attempt to exfiltrate sensitive information. This approach may recognize that threat significance and nature may vary based on the context. The contextual analysis may enable security teams to prioritize responses according to each incident's specific circumstances. The contextual analysis may support a more strategic security approach, enabling the organizations to focus resources on threats with the highest potential impact.

Further, the AI model 216 may Identify and categorize threats based on intricate behavioral patterns going beyond simple attribute matching. This ability may allow for identification and labeling of sophisticated threats. In other words, instead of solely relying on specific characteristics or attributes of a threat, the AI model 216 may explore deeper into the behavioral nuances exhibited by potential threats, allowing for a more comprehensive understanding and detection. For example, an anomaly demonstrating lateral movement within a network and attempts to escalate privileges may be labeled as an "Advanced Persistent Threat (APT)", denoting considerable sophistication and potential danger. Analyzing the behavioral patterns may enhance comprehension of attackers' tactics, techniques, and procedures (TTPs), facilitating a creation of robust defense strategies.

In some embodiments, severity and impact assessment may be integrated with labeling process to enable a more nuanced understanding of threats. This aspect may help evaluate a potential damage a threat that may cause, considering factors such as a sensitivity of data at risk, a criticality of affected systems, and threat's capabilities. For example, a threat targeting critical infrastructure may be labeled as "High Severity: Infrastructure Disruption", highlighting both a nature of the threat and its potential consequences. This layered labeling approach may enable organizations to quickly identify and prioritize their response to the most dangerous threats, ensuring that resources are allocated where they are needed most.

In some embodiments, the threats may be labeled based on their lifecycle stages. This offers insights into their current relevance and potential future behavior. For example, the threats may be classified as "Emerging", "Active", "Declining", or "Dormant", providing valuable context for the analysts. A label "Emerging" may be assigned to a new ransomware variant that is beginning to spread, signaling a need for immediate attention to prevent widespread infection. This temporal dynamic labeling may help the organizations understand evolving threat landscape, enabling them to adapt their defenses in real time and anticipate future security challenges.

In some embodiments, the labeling may be a cross-category labeling. The cross-category labeling may address a complexity of modern threats that often span multiple types or categories. The cross-category labeling may allow for assignment of labels that reflect a multifaceted nature of the threats. For example, a malware that spreads through phishing emails but also includes ransomware capabilities may be labeled as "Phishing-Distributed Ransomware". This hybrid label provides a concise summary of the threat's characteristics, facilitating a comprehensive understanding and effective response. The cross-category labeling may ensure that the multifunctional aspects of the threats may be recognized and addressed, enhancing a precision of threat analysis and response strategies.

In some embodiments, predictive labeling may be performed. For example, the predictive labeling for proactive defense may be performed. The predictive labeling may leverage analytics to forecast potential future actions of a detected threat, assigning labels that not only describe a current state but also anticipate next moves. This forward-looking approach may label a newly discovered botnet as "Potential DDOS Source", indicating both the current state and a likely intent behind its creation. The predictive labeling may enable the organizations to shift from a reactive to a proactive security stance, preparing defenses against anticipated threats before they materialize. Thus, organizations' ability to protect themselves against emerging cyber threats may be enhanced by the predictive labeling.

It should be noted that the computing device 102 may be implemented in programmable hardware devices such as programmable gate arrays, programmable array logic, programmable logic devices, or the like. Alternatively, the computing device 102 may be implemented in software for execution by various types of processors. An identified engine/module of executable code may, for instance, include one or more physical or logical blocks of computer instructions which may, for instance, be organized as an object, module, procedure, function, or other construct. Nevertheless, the executables of an identified engine/module need not be physically located together but may include disparate instructions stored in different locations which, when joined logically together, comprise the identified engine/module and achieve the stated purpose of the identified engine/module. Indeed, an engine or a module of executable code may be a single instruction, or many instructions, and may even be distributed over several different code segments, among different applications, and across several memory devices.

As will be appreciated by one skilled in the art, a variety of processes may be employed for AI-based self labelling. For example, the exemplary system 100 and associated computing device 102 may perform AI-based self labelling, by the process discussed herein. In particular, as will be appreciated by those of ordinary skill in the art, control logic and/or automated routines for performing the techniques and steps described herein may be implemented by the system 100 and the associated computing device 102 either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all the processes described herein may be included in the one or more processors on the system 100.

Figure 3:
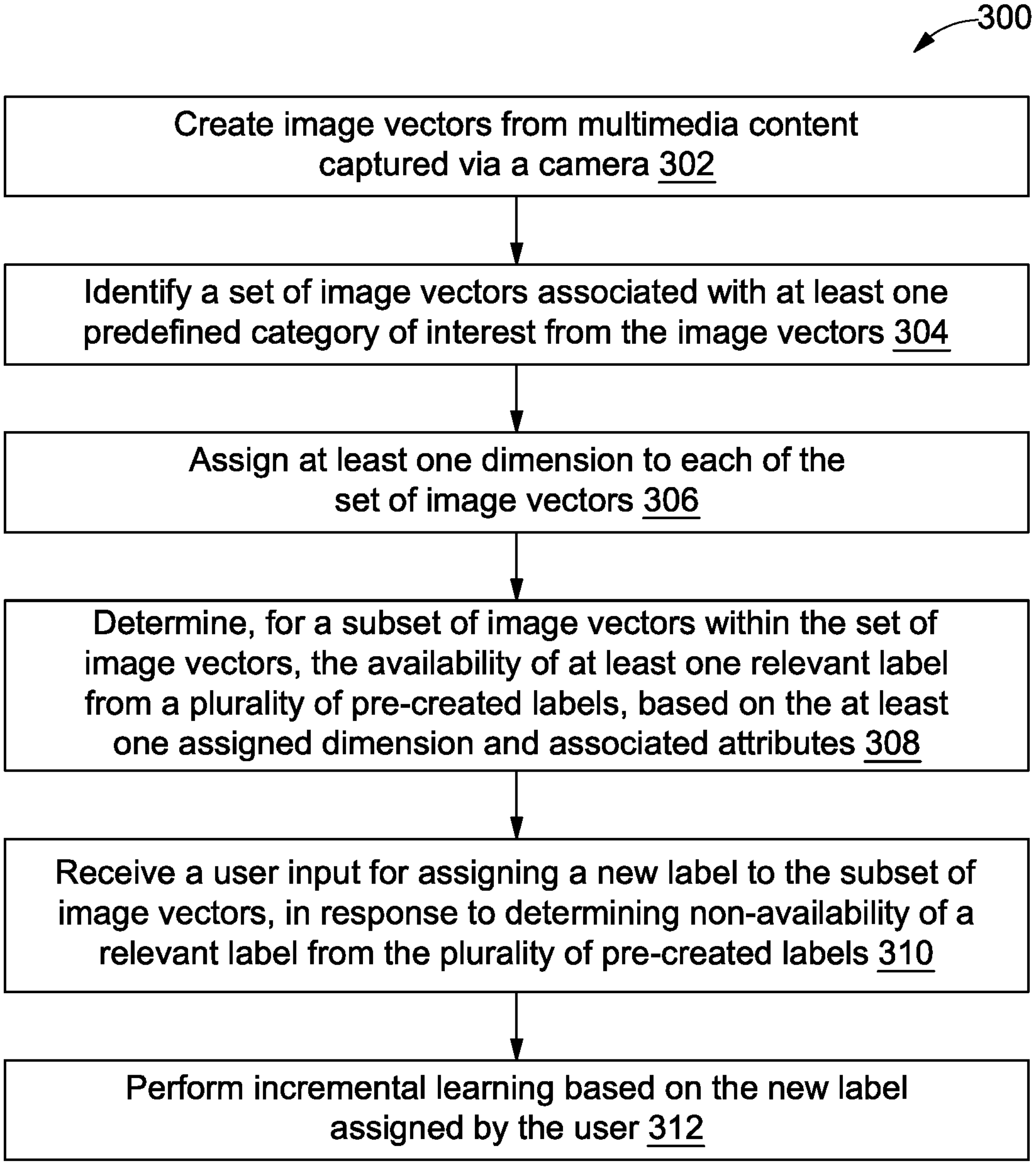
FIG. 3 is a flow diagram of an exemplary process for Artificial Intelligence (AI) based self-labelling, in accordance with some embodiments of the present disclosure.

Referring now to FIG. 3, a flow diagram of an exemplary process 300 for Artificial Intelligence (AI) based self-labelling is depicted via a flow chart, in accordance with some embodiments of the present disclosure. Each step of the process 300 may be performed by a computing device (such as the computing device 102). FIG. 3 is explained in conjunction with FIGS. 1-2.

At step 302, image vectors may be created in real-time from multimedia content (such as the multimedia content 214). The multimedia content may be captured via one or more cameras (such as the camera(s) 114). This step may be performed using a vector creation module (such as the vector creation module 202). The multimedia content may include, but is not limited to, images, videos, or any other visual data captured by the cameras. By way of an example, the multimedia content may be a footage from security cameras monitoring a facility. The image vectors represent key attributes of the multimedia content. For example, in the case of images, the image vectors may represent pixel values, color histograms, texture features, or other image descriptors. Further, the cameras may be, but are not limited to, a digital camera, an analog camera, a smartphone camera, an action camera, a webcam, a security camera, a film camera, an aerial camera (for example a drone camera), a medical camera, a hybrid camera, and the like.

At step 304, a set of image vectors associated with at least one predefined category of interest may be identified from the image vectors using a vector identification module (such as the vector identification module 204) and an Artificial Intelligence (AI) model (such as the AI model 216). The AI model 216 may correspond to a trained AI model. The AI model may be a single AI model or an ensembled AI model. For example, in some embodiment, different AI models may be used to perform different steps. Alternatively, in some embodiments, the single AI model may be used to perform different steps. It should be noted that the predefined category of interest may include, but is not limited to, a threat, debris, reconnaissance, surveillance, intrusion detection, intrusion elimination, unknown object detection, suspicious object detection swarm detection, payload analysis, accident investigation, anti-drone measures, environment monitoring, traffic monitoring, wildfire monitoring, flood monitoring, oil spill monitoring, urban planning, weapon detection, violence detection, agricultural monitoring, vessel classification, border monitoring, illegal activity detection, and danger.

For example, the category of interest may be military air objects requiring detection and classification of military aircraft, including jets and helicopters, to monitor airspace activity and maintain national security. The category of interest may be suspicious drones that require identification of drones that may be operating in restricted or sensitive areas, potentially posing security risks or privacy violations. The category of interest may be large drones requiring tracking and monitoring large drones, which are capable of carrying heavier payloads and may be used for commercial, surveillance, or military purposes.

The category of interest may be unknown objects requiring detection and identification of unclassified or unidentified aerial objects using advanced sensors and algorithms, ensuring rapid response to potential aerial threats. The category of interest may be air traffic monitoring that includes overseeing and managing movement of aircraft within a specified airspace to ensure safe navigation and prevent collisions or airspace violations. The category of interest may be swarm detection that includes identification and analyzation of clusters of drones or Unmanned Aerial Vehicles (UAVs) operating collectively, potentially posing security or privacy risks. The category of interest may be payload analysis focusing on identification and evaluation of cargo or equipment transported by aerial vehicles, vital for security measures and regulatory adherence. The category of interest may be aerial accident investigation that includes utilization of aerial reconnaissance to collect data and analyze factors contributing to air accidents, facilitating rescue efforts, and enhancing aviation safety standards. Further, the category of interest may be anti-drone measures that includes utilization of counter-drone technologies to detect, track, and potentially neutralize unauthorized or hostile drones in sensitive or restricted areas. The category of interest may be border surveillance that deploys aerial surveillance technologies to monitor national borders, identifying illegal crossings, smuggling activities, and other security breaches. Additionally, the category of interest may be environmental monitoring, infrastructure inspection, search and rescue operations, and the like.

By way of an example, consider a smart city initiative aimed at enhancing urban safety and security through use of surveillance cameras equipped with advanced image processing capabilities. The cameras are strategically placed across the city to monitor various aspects of public safety, traffic management, and environmental conditions. Initially, the multimedia content may be captured via the cameras in a form of video streams depicting different scenes and activities within the city. Further, the multimedia content may be processed to extract key features and convert them into image vectors. For example, the features may be vehicle types, pedestrian movements, object shapes, and environmental conditions from video frames. Further, a set of image vectors with a pre-defined category of interest may be identified from the created image vectors. In one example, the category of interest may be suspicious individuals, unattended bags, unauthorized access to restricted areas, and the like. In one example, the category of interest may be traffic congestion, violation of traffic rules, and the like. In one example, the category of interest may be air pollution, noise pollution, hazardous waste spills and the like. In one example, the category of interest may be unauthorized intrusions into secure premises or restricted zones. In one example, the category of interest may be natural disasters such as wildfires, floods, or earthquakes.

Further, at step 306, at least one dimension may be assigned to each of the set of image vectors. The at least one dimension may include a frequency dimension, a recency dimension, and a pattern dimension. The frequency dimension may correspond to frequency of occurrence of an event, a behavior, or an activity captured within the set of image vectors. This is a measure of how often a specific event, a behavior, an activity, or feature appears in the set of image vectors. For example, in one embodiment, surveillance cameras may record instances of vehicles or individuals moving in proximity to border fence during nighttime hours, indicating potential illegal activity. Each instance contributes to the frequency dimension, helping border security officials to identify hotspots or patterns of the illegal activity. The pattern dimension may correspond to a sequence of occurrences. For example, the pattern dimension may include identifying recurring patterns of behavior, activities, or events that may indicate the illegal activity or suspicious behavior. The recency dimension may correspond to time-based proximity with a timestamp associated with the multimedia content. The recency dimension may indicate time passed since the illegal activity occurred. It should be noted that recent incidents may have higher recency dimension values.

At step 308, the availability of at least one relevant label may be determined for a subset of image vectors within the set of image vectors. To determine the availability, the at least one assigned dimension and associated attributes may be considered. The plurality of pre-created labels may be assigned to historical image vectors. This step may be performed using a label determination module (such as the label determination module 208) and the AI model. It should be noted that each of the plurality of pre-created labels may include a multi-tiered hierarchy of child labels. The plurality of pre-created labels may correspond to parent labels. By way of an example, in case of Foreign Object Debris Detection (FOD) system application, the parent labels may be a location specific FOD, an equipment specific FOD, a maintenance-oriented FOD, a safety-focused FOD, an environment specific FOD, and the like. Further, for the parent label the "location specific FOD", the child labels may be "flight deck FOD", "hangar FOD", "runway debris", "deck edge FOD", and the like. For the parent label "equipment based FOD", the child labels may be "engine inlet FOD", "propeller FOD", "intake FOD", and "rotor blade FOD". For the "maintenance-oriented FOD", the child labels may be a "safety-focused FOD", and an "environment based FOD". This is further explained in detail in FIG. 4.

Thereafter, at step 310, a user selection may be received for assigning a new label to the subset of image vectors by a label assignment module (such as the label assignment module 210). It should be noted that the user may provide an input as the user selection in case of non-availability of a relevant label in the pre-created labels. The user selection may be the new label suggested by the user for the subset of the image vectors. In some embodiments, the at least relevant label may be assigned to the subset of image vectors using the label assignment module and the AI model. Alternatively, the new label may be assigned to the subset of image vectors based on the user selection using the label assignment module and the AI model. Further, at step 312, incremental learning may be performed by the AI model based on the new label, which is further explained in detail in FIG. 5.

By way of an example, consider a scenario where a security surveillance system is installed at a military base equipped with cameras for monitoring various areas, including a perimeter fence and restricted zones. In such a case, a scene may be recorded using the cameras. The scene may correspond to the multimedia content. Further, image vectors may be created from the recorded multimedia content and then a set of image vectors associated with at least one predefined category of interest may be identified from the image vectors. For example, if the recorded scene shows a person walking near the perimeter fence, the corresponding image vectors may encode characteristics such as person's shadow, a shape of the fence, and surrounding environment. The set of image vectors may refer to a collection of multiple image vectors extracted from a series of the recorded multimedia content. For example, if a security camera records a 10-minute scene including various activities near the perimeter fence such as "people walking", "vehicles passing by", or "animals moving around", the set of image vectors may include representation of at least one activity captured within that timeframe such as "people walking". It should be noted that "people walking" may be within pre-defined categories of interest. Further, at least one dimension may be assigned to each of the set of image vectors. The at least one dimension may be a frequency dimension, a recency dimension, and a pattern dimension. For example, the frequency dimension may indicate the number of times individuals approach the perimeter fence during a specific timeframe. The recency dimension may indicate when the last breach of the perimeter fence occurred. The pattern dimension may detect repetitive behaviors such as periodic patrols along the perimeter fence.

Moreover, availability of a relevant label such as "intruder", "vehicle approaching perimeter", or "suspicious activity" may be determined for a subset of image vectors within the set of image vectors based on the at least one assigned dimension and associated attributes. For example, the subset of image vectors within the set of image vectors includes only image vectors corresponding to individuals approaching or breaching the fence. In such a case, the relevant label may be "intruder". In case of successfully determining the availability of the relevant label, the relevant label may be assigned to the subset of image vectors. For example, if an unauthorized personnel breaching the perimeter fence is detected, the relevant label "intruder" may be assigned to corresponding image vectors (i.e., the set of image vectors). In cases where the AI model is unable to determine a relevant label or encounters an unfamiliar scenario, user intervention may be received. An alert may be sent to the user about anomaly or event requiring manual assessment (for example, a security operator or personnel monitoring surveillance feed). In that case, the user may review the set of image vectors and identify the nature of the anomaly or the event that the AI model failed to categorize accurately. The user may provide an input by selecting or specifying a new label to describe the observed anomaly or the event. For example, if the AI model fails to recognize a maintenance crew conducting routine checks near a restricted zone, the user may input the new label as "authorized maintenance personnel" or "routine inspection". The new label provided by the user may be assigned to the subset of image vectors associated with the anomaly or the event. The new label defined by the user may be incorporated into an associated database for future reference, enabling the AI model to learn and improve its recognition capabilities over time.

In some embodiments, the pattern dimension may be prioritized for initial analysis. Further, the other dimensions such as the frequency dimension and the recency dimension may be considered for further validation. Initially, patterns may be considered when analyzing data. By identifying these patterns first, further validation may be performed by considering other aspects like how often these patterns occur and how recent they are. This ensures that the analysis is thorough and reliable, setting a standard for effective data examination in various industries. In other words, the analysis may begin by matching patterns, focusing on identifying key parts of objects. For example, in case of a blurry image of a face, the key parts may be eyes, nose, ears, and the like. Once the patterns are recognized, other dimensions such as frequency and recency may be considered to validate the identification. It should be noted that pattern matching is the primary criterion for labeling, in accordance with some embodiments of the invention.

Figure 4:
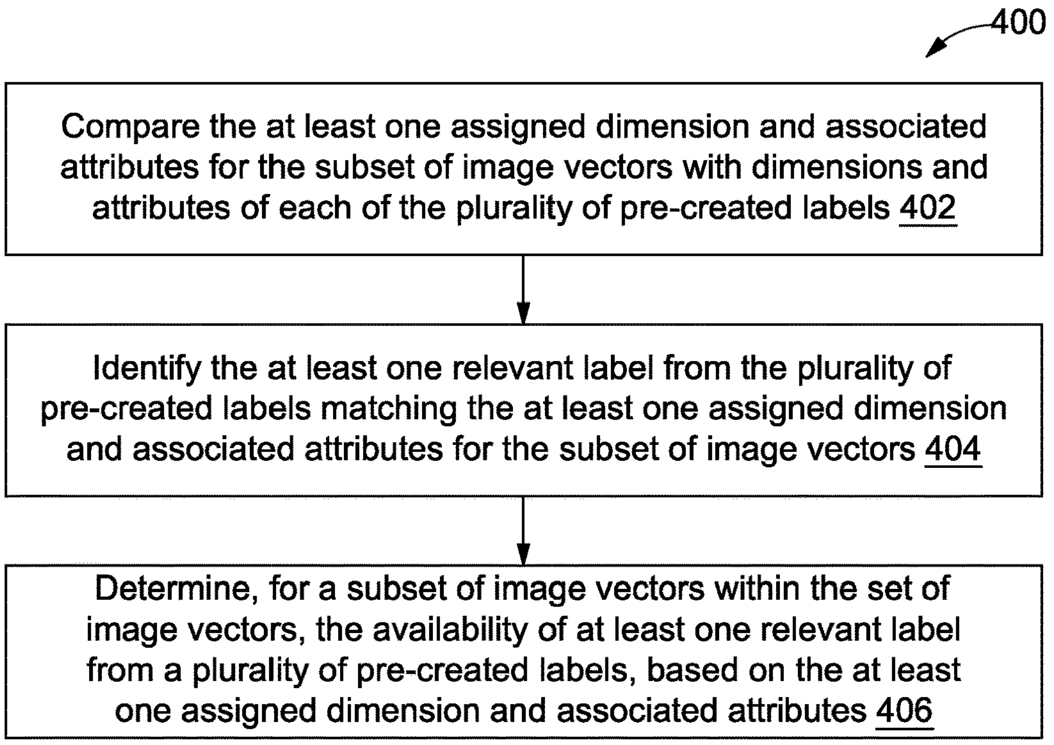
FIG. 4 is a flow diagram of a process for determining availability of a relevant label from pre-created labels, in accordance with some embodiments of the present disclosure.

Referring now to FIG. 4, a flow diagram of an exemplary process 400 for determining availability of a relevant label from pre-created labels is depicted via a flow chart, in accordance with some embodiments of the present disclosure. Each step of the process 400 may be performed by a label determination module (such as the label determination module 208). FIG. 4 is explained in conjunction with FIGS. 1-3.

At step 402, the assigned dimension, and the associated attributes for the subset of image vectors may be compared with dimensions and attributes of each of the plurality of pre-created labels. The attributes may include, but are not limited to, size, shape, color, or any other relevant characteristics that help define the nature of objects or events depicted in the subset of image vectors. Further, at step 404, the relevant label from the plurality of pre-created labels matching the one or more assigned dimensions and associated attributes for the subset of image vectors may be identified. The matching includes finding a pre-created label whose characteristics correspond to the subset of image vectors. For example, if the subset of image vectors indicates frequent occurrences of small, moving objects near a perimeter fence, the relevant label identified may be "Intruder". Thereafter, at step 406, the availability of at least one relevant label from a plurality pre-created labels may be determined for the subset of image vectors within the set of image vectors.

Figure 5:
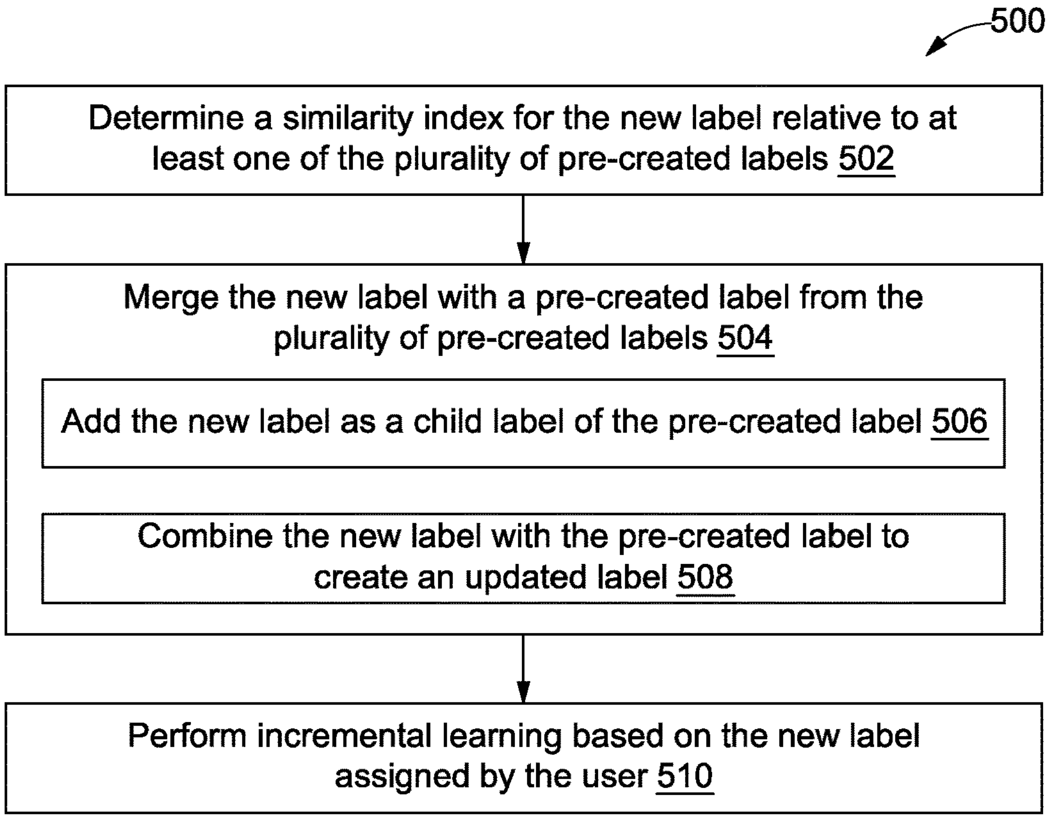
FIG. 5 is a flow diagram of a process for performing incremental learning by an Artificial Intelligence (AI) model, in accordance with some embodiments of the present disclosure.

Referring now to FIG. 5, a flow diagram of an exemplary process 500 for performing incremental learning by an Artificial Intelligence (AI) model (such as the AI model 216) is depicted via a flow chart, in accordance with some embodiments of the present disclosure. FIG. 5 is explained in conjunction with FIGS. 1-4.

At step 502, a similarity index may be determined for the new label relative to at least one of the plurality of pre-created labels. As will be apparent to a person skilled in the art, the similarity index serves as a measure to assess how closely aligned attributes, characteristics, or categories of the new label are with those of the plurality of pre-created labels. At step 504, the new label may be merged with a pre-created label from the plurality of pre-created labels. It should be noted that the similarity index of the pre-created label relative to the new label is the highest. At step 504*a*, to merge the new label, the new label may be added as a child label of the pre-created label. Alternatively, at step 504*b*, to merge the new label, the new label may be combined with the pre-created label to create an updated label. At step 506, incremental learning may be performed based on the new label assigned by the user.

By way of an example, consider a scenario where the plurality of pre-created labels is such as "physical altercation", "weapon brandishing", "verbal abuse" and "aggressive behavior". Now, a user submits a new label as "fistfight". In this scenario, the new label "fistfight" may have the highest similarity with the pre-created label "physical altercation". This is because both terms describe forms of physical violence involving direct physical confrontation between individuals. Thus, "physical altercation" may be the pre-created label with the highest similarity index relative to the new label "fistfight" within the context of violence detection. Thus, the new label "fistfight" may be added as a child label to the procreated label "physical altercation".

In some embodiments, a similarity score of the subset of image vectors with respect to the historical image vectors may be determined. Further, it may be checked if the similarity score is above a pre-defined threshold. In case the similarity score is above or equal to the predefined threshold, correspondence between specific portions of the subset of image vectors and segments within the historical image vectors may be analyzed. Alternatively, in case the similarity score is below the pre-defined threshold, a human-in-the-loop (HITL) approach may be employed.

Further, when the similarity score is above or equal to the pre-defined threshold, and some features of the subset of image vectors are similar to existing features if the historical image vectors, then the AI model may self-assign a new label closely aligned with the common features. For example, if the common features indicate an existing category or a pre-created label such as "firearm", the new label closely aligned may be a particular type of gun, such as a pistol or a rifle. In some embodiments, when the similarity score is below the pre-defined threshold, the user may be guided by providing information about the common features or similarities between the subset of image vectors and the historical image vectors. This guidance may help the user to choose an appropriate label based on the common features. For example, if the similarity to both "handgun" and "shotgun" categories is detected, information about the similarity may be presented to the user, along with specific features that match each pre-created label. The user may then make an informed decision on how to label the subset of image vectors, such as creating the new label that combines aspects of both "handgun" and "shotgun".

In short, when a new instance within the set of image vectors is encountered, initially a degree of similarity between the new instance and historical image vectors may be evaluated. This evaluation may be based on a comparison of feature vectors, which represent characteristics of the multimedia content. The AI model may calculate a similarity, to determine how closely the new instance aligns with one or more of the plurality of pre-created labels. If the similarity crosses the predefined threshold, the AI model may automatically suggest that the new instance may belong to a specific pre-created label or its subcategory. Further, the AI model may analyze which parts of the set of image vectors match those of the plurality of pre-created labels (i.e., existing categories). This detailed comparison helps in understanding common characteristics between the new instance and the existing categories. Based on this matching, the AI model may suggest that the new instance may be labeled as a new subcategory closely aligned with a known category, such as specifying a type of dog or a type of cat if a main category is "animals". Further, the AI model may present its findings and suggestions to the user (i.e., a human operator), highlighting the similarity and the common features. This information may help guiding the user in making the informed decision about the new label. The user may then either confirm the suggestion of the AI model, thus creating a new subcategory label, or provide a different new label based on their assessment. This step ensures incorporation of human assessment, especially in complex cases where nuanced understanding is crucial. Once the new label is assigned, a knowledge base or the database may be updated with this information. The AI model may learn from this human-verified decision, improving its future suggestions for both automated labeling and HITL interactions. Over time, this process may minimize a need for human intervention as the AI model may become more adept at identifying similarities and making accurate label suggestions.

Figure 6A:
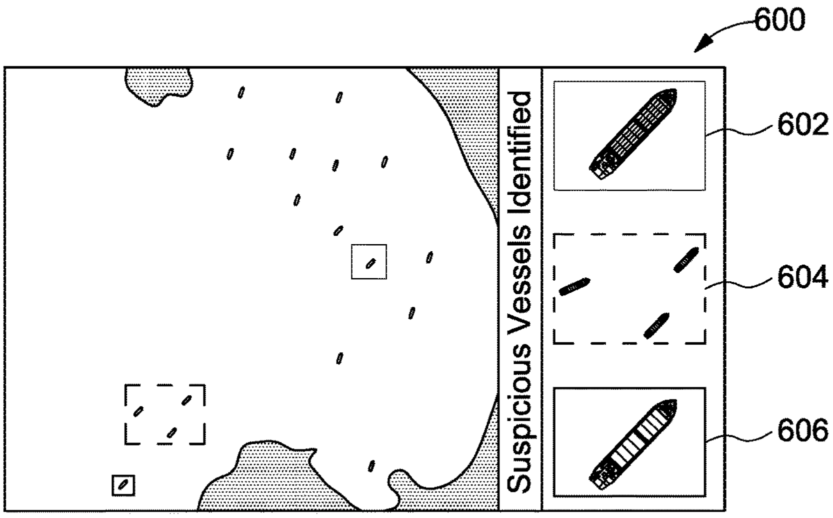
FIGS. 6A-6C illustrate an exemplary scenario of AI based self-labelling upon identification of suspicious vessels in a designated area, in accordance with some embodiments of the present disclosure.
Figure 6B:
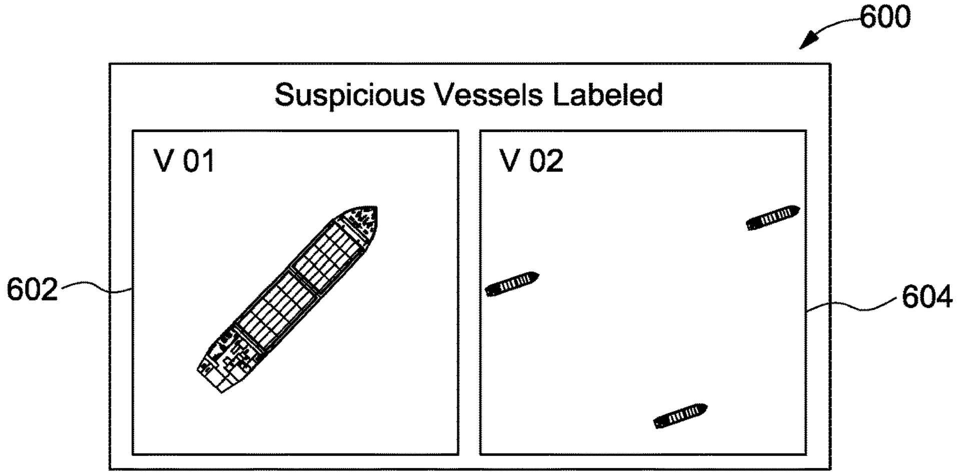
Figure 6C:
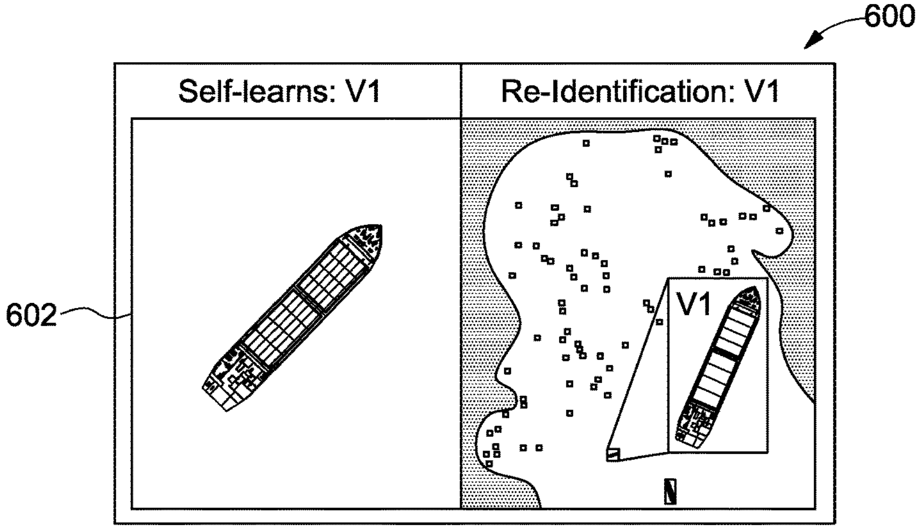

Referring now to FIGS. 6A-6C, an exemplary scenario 600 of Artificial Intelligence (AI) based self-labelling upon identification of suspicious vessels in a designated area is depicted, in accordance with some embodiments of the present disclosure. FIGS. 6A-6C are explained in conjunction with FIGS. 1-5. FIG. 6A illustrates identification of various vessels 602, 604, and 606. The vessels 602, 604, 606 may correspond to suspicious vessels. This may include use of surveillance cameras or other monitoring systems to detect vessels within the designated area, such as a harbor or waterway. An AI model may analyze visual data captured by these surveillance cameras to identify different types of vessels present in the vicinity. The vessel 602 may be an unknown vessel, the vessel 604 may be a partially known vessel, and the vessel 606 may be a known vessel.

FIG. 6B illustrates labelling of the vessels 602, and 604. These labels may indicate a type of vessel (e.g., cargo ship, fishing boat, or recreational vessel) or any specific characteristics that are relevant to context, such as size or behavior. FIG. 6C illustrates self-learning of unknown identified vessel 602 temporarily from few experiences and reidentification if seen again. Here, in FIG. 6B, the vessel 602 is temporarily labelled based on a user input. However, if the same vessel 602 is detected again in the future as illustrated in FIG. 6B, the AI model may re-identify the vessel 602 and update its label accordingly. This may reflect an ability to learn and adapt over time, improving its accuracy and effectiveness in identifying and categorizing vessels, especially those that may be considered suspicious or pose a potential threat.

Figure 7A:
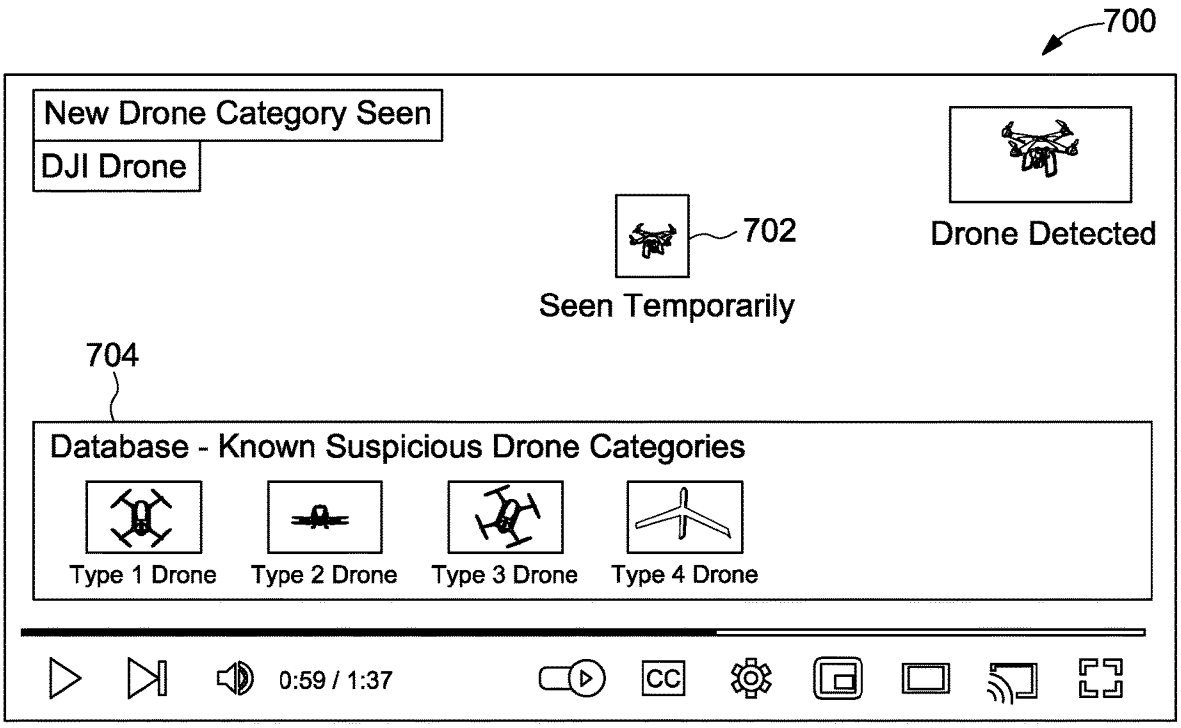
FIGS. 7A-7D illustrate an exemplary scenario of temporary learning process of a new drone category, in accordance with some embodiments of the present disclosure.

Referring now to FIGS. 7A-7D, an exemplary scenario 700 of temporary learning process of a new drone category, in accordance with some embodiments of the present disclosure. FIGS. 7A-6D are explained in conjunction with FIGS. 1-6A-6C. In FIG. 7A, a new drone 702 may be detected temporarily. The new drone 702 may belong to a new category and pose a new label not available in a database 704 which includes pre-created labels for drones with known categories. As illustrated in FIG. 7A, the database 704 includes drones with categories "Type 1", "Type 2", "Type 3", and "Type 4".

Figure 7B:
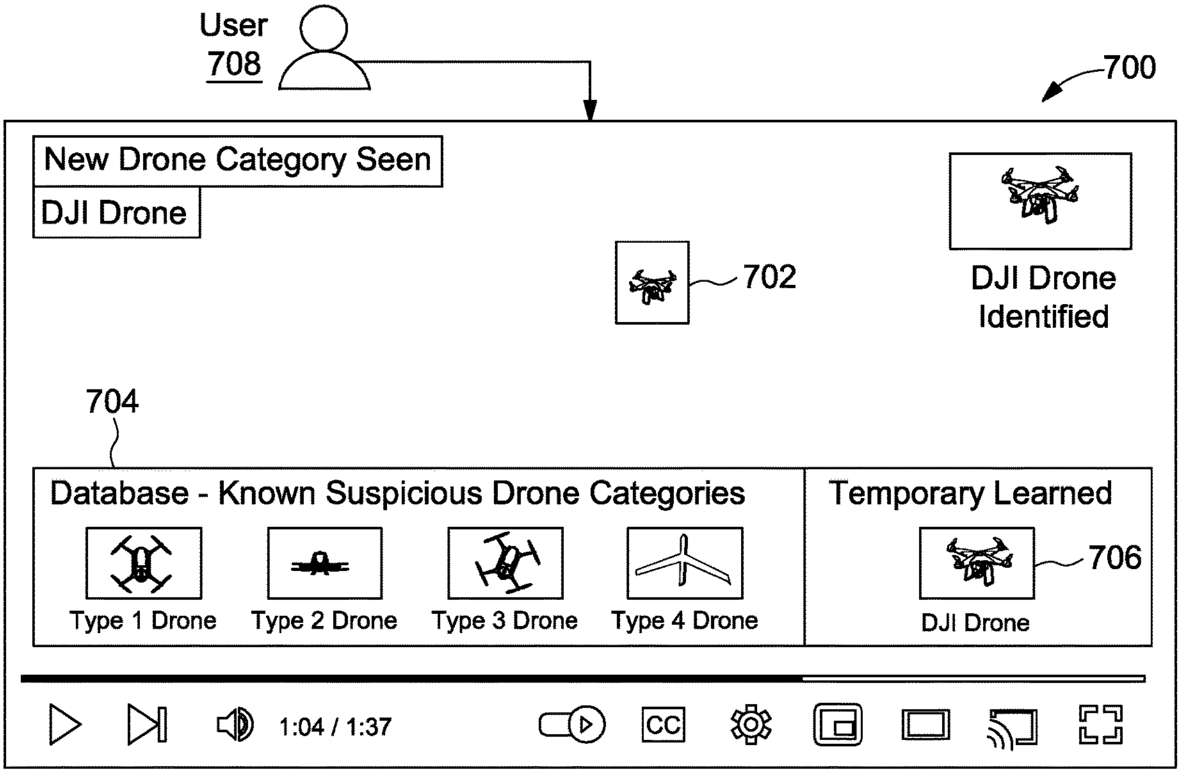
Figure 7C:
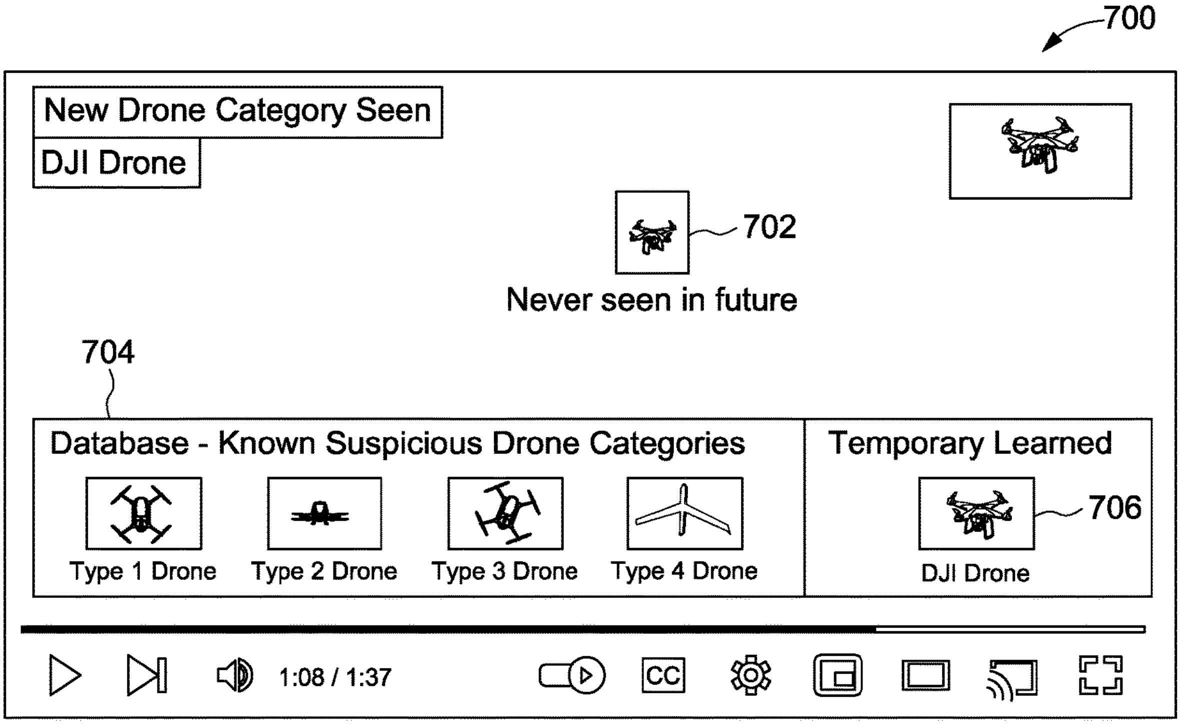
Figure 7D:
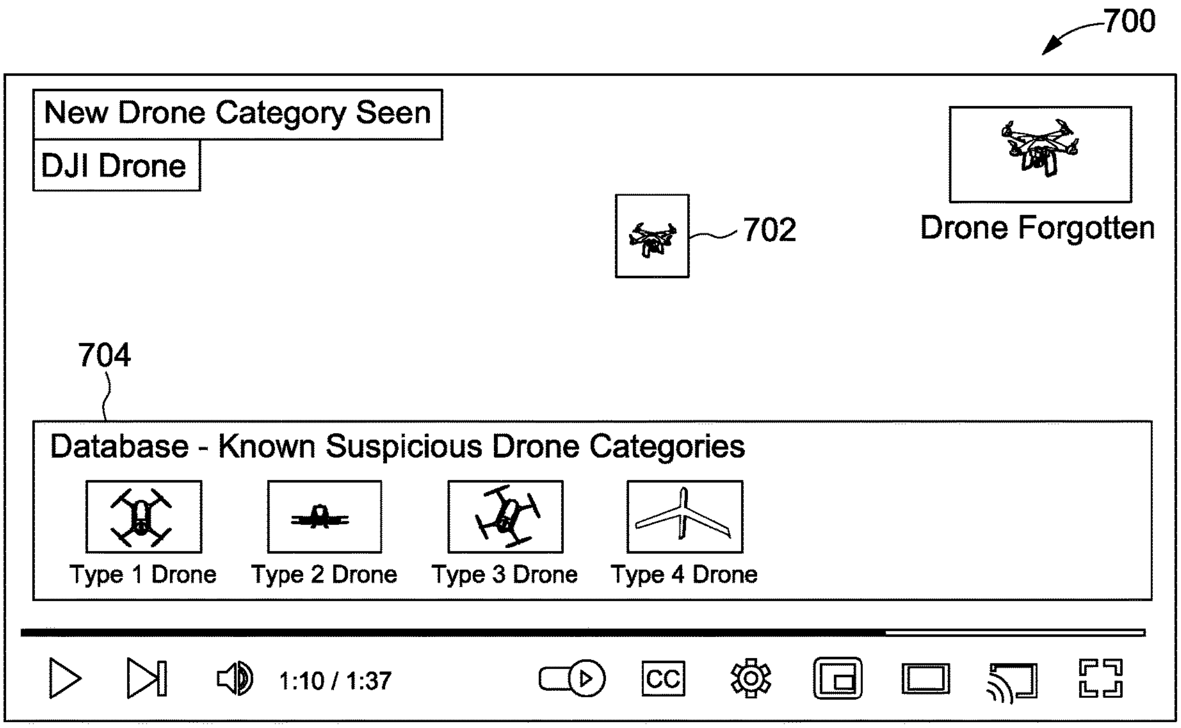

Referring now to FIG. 7B, since a relevant label for the new drone 702 is absent in the database 704, a user input or a new label 706 as "DJI drone" may be received from a user 708. Subsequently, the AI model may learn about the new drone 702 along with corresponding new label 706 as "DJI drone" temporarily. As a result, the new label 706 as "DJI drone" for the new drone 702 may be added temporarily in the database 704. In FIG. 7C, it is illustrated that the new drone 702 labelled as "DJI drone" is not encountered again in future within a predefined time period. Consequently, FIG. 7D illustrates removal or discarding of the new drone 702 and the corresponding new label 706 as "DJI drone" from the database 704, as the new drone is never seen again or absent in subsequent observations.

Figure 8A:
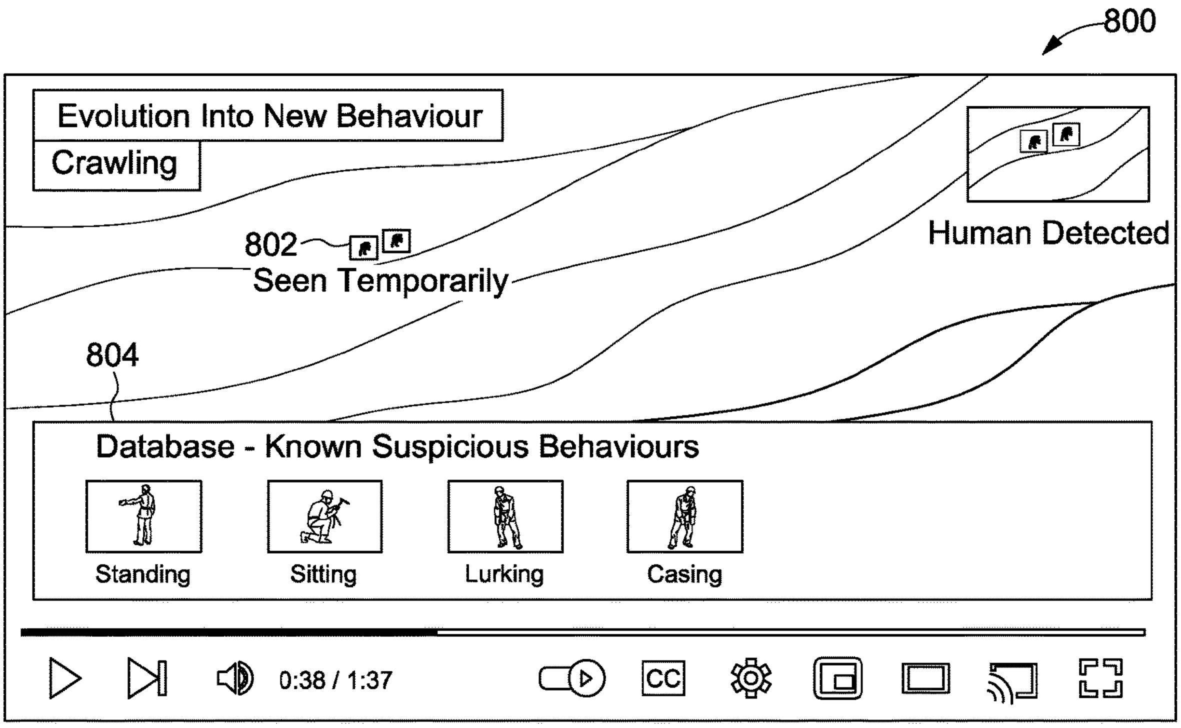
FIGS. 8A-8D illustrate an exemplary scenario of permanent learning process of a new behavior, in accordance with some embodiments of the present disclosure.
Figure 8B:
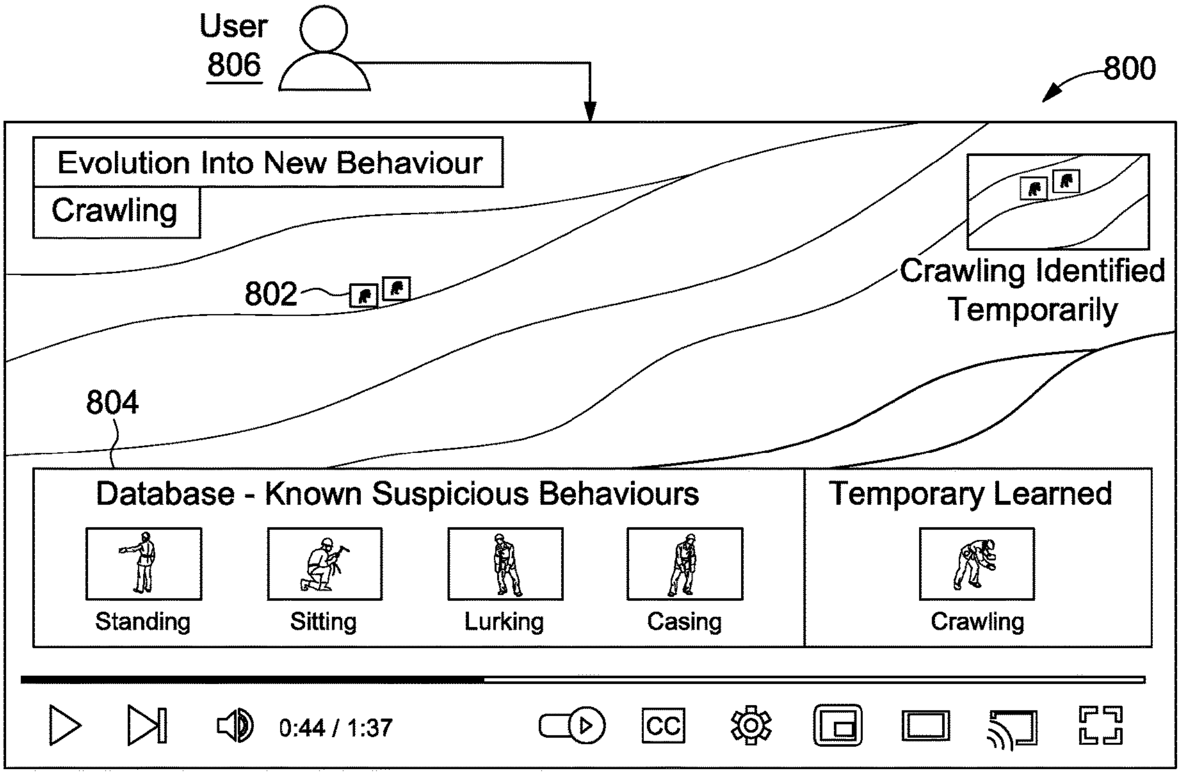

Referring now to FIGS. 8A-8D, an exemplary scenario 800 of permanent learning process of a new behavior, in accordance with some embodiments of the present disclosure. FIGS. 8A-8D are explained in conjunction with FIGS. 1-7A-7D. In FIG. 8A, a temporary detection of a human 802 is illustrated. Additionally, there is a database 804 associated with an AI model includes known behaviors such as "standing", "sitting", "lurking", and "casing". Further, in FIG. 8B, a new behavior associated with the human 802 may be temporarily identified as "crawling". It should be noted that "crawling" may be identified as the new behavior due to its absence in the database 804. In some embodiment, a user input, or a new label as "crawling" for the new behavior may be received from a user 806. Thus, the AI model may learn "crawling" and it may be stored in the database 804, temporarily.

Figure 8C:
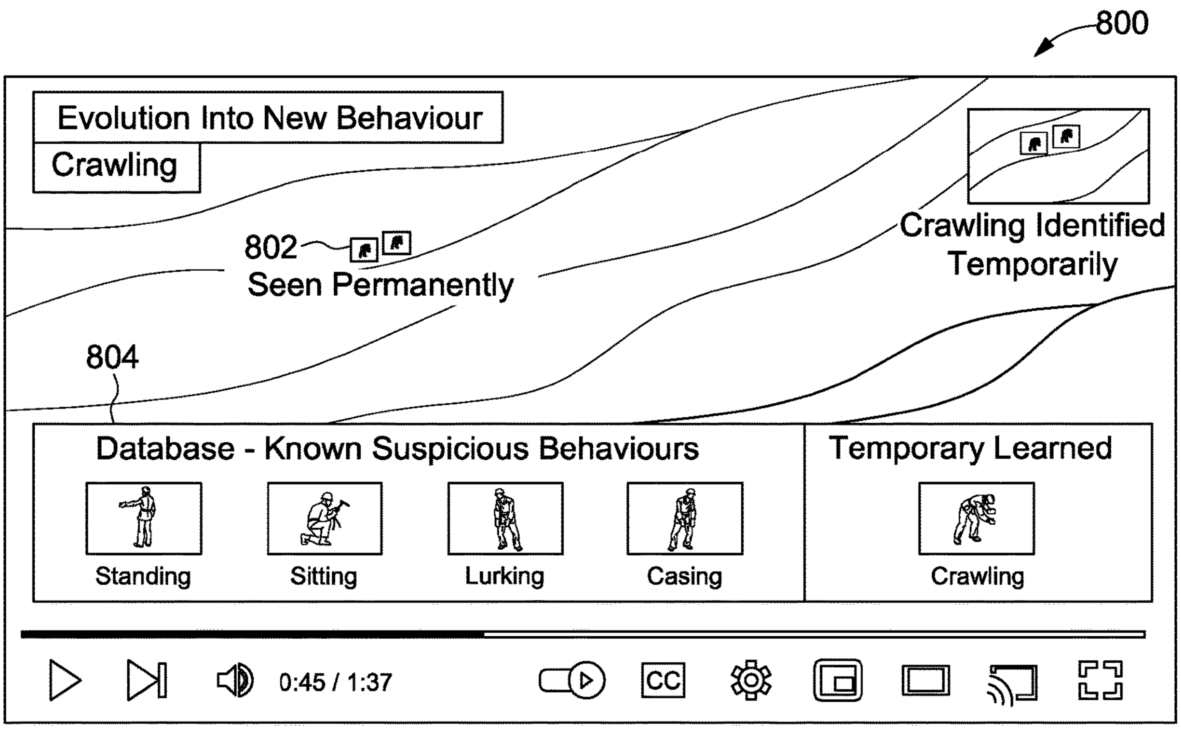
Figure 8D:
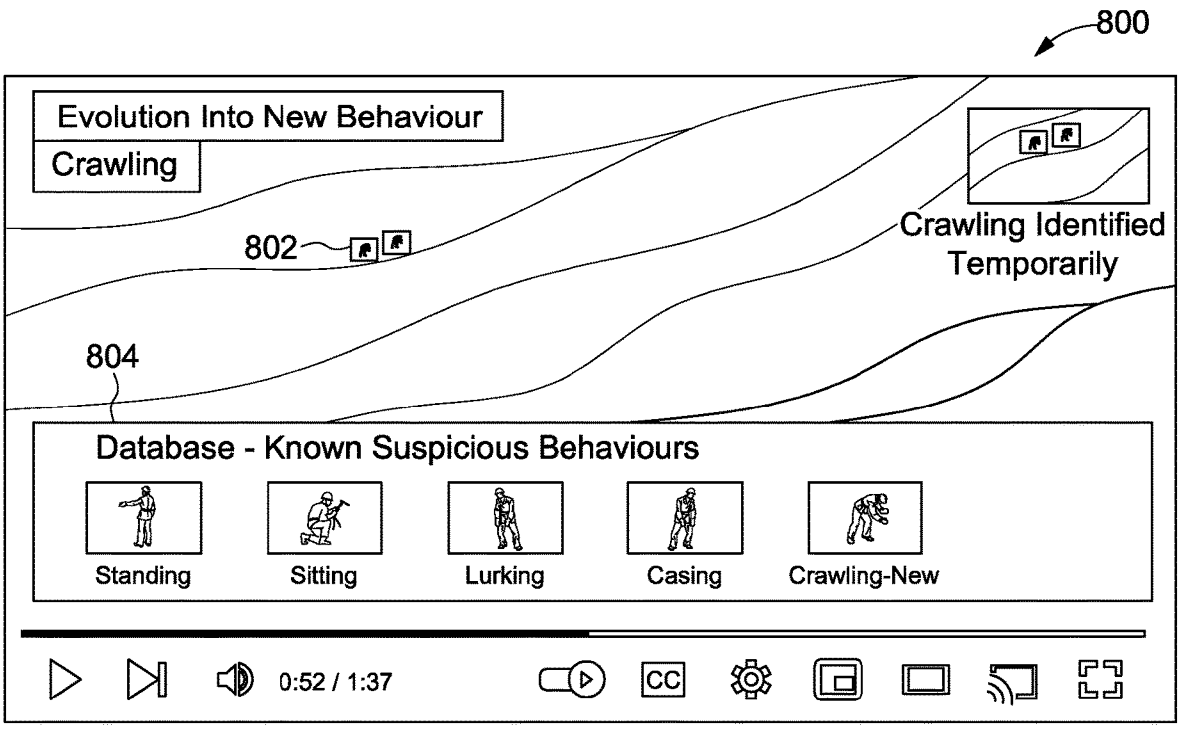

In FIG. 8C, it is illustrated that the new behavior is observed consistently over a certain time period. For example, the AI model continues to monitor behavior of the human and consistently observes instances of occurrences of "crawling". The sustained observation indicates that "crawling" is not merely a one-time occurrence but a consistent pattern of behavior. In FIG. 8D, since the new behavior "crawling" is observed permanently, the AI model permanently learns this behavior and "crawling" may be added permanently to the database 804. This means that "crawling" is now recognized as a known behavior by the AI model and may be used for future analysis and decision-making processes. In short, the AI model detects, learns, and permanently incorporates a new behavior into the database 804 if it is observed consistently.

The AI model may self-identify and adapt to recognize new behaviors, new threats, new objects. The AI model may continuously analyze incoming data, detect patterns, and identify potential threats or risks. As it encounters new data, situation, or environment, the AI model may autonomously update its understanding and detection capabilities, thereby evolving to better recognize and respond to emerging threats over time.

Figure 9:
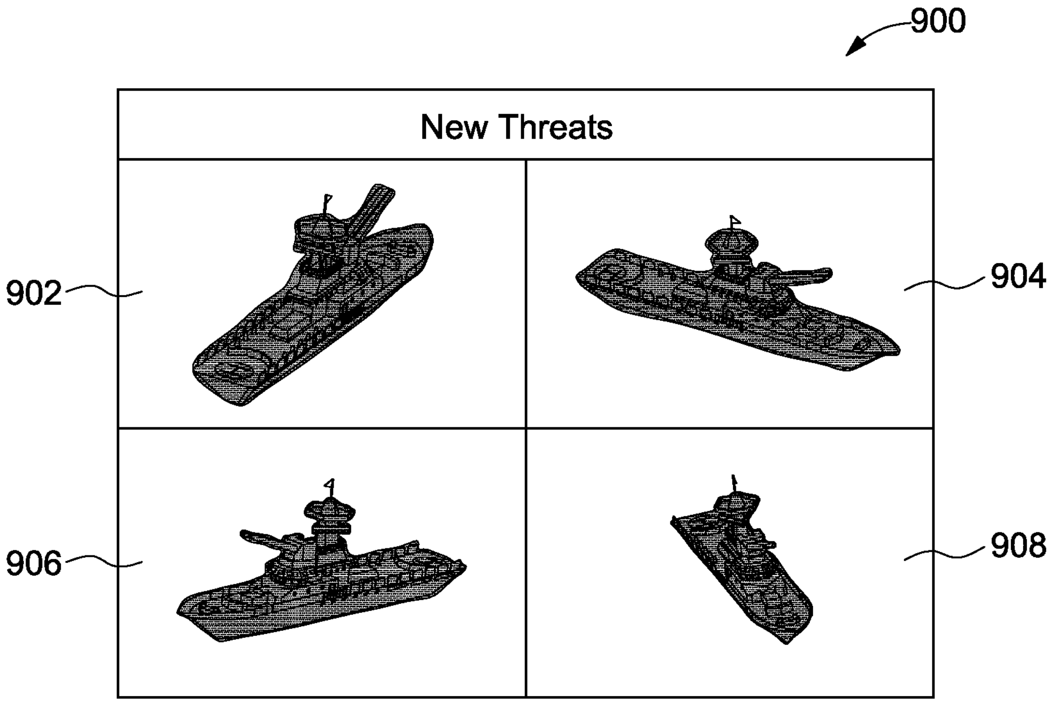
FIG. 9 illustrates exemplary new threats, in accordance with some embodiments of the present disclosure.

Referring now to FIG. 9, exemplary new threats 900 are illustrated, in accordance with some embodiments of the present disclosure. FIG. 9 is explained in conjunction with FIGS. 1-8A-8D. FIG. 9 includes various unknown vessels such as a vessel 902, a vessel 904, a vessel 906, and a vessel 908. In one example, the unknown threats may be Unmanned Aerial Vehicles (UAVs) of different shapes. In one example, the unknown threats may be suspicious behaviors. These behaviors may include drifting in sensitive areas, exhibiting irregular movements, carrying out unauthorized access attempts, or engaging in other anomalous activities. In one example, the new threats may include new payload types. The new payload types encompass a wide range of items or materials transported from one location to another, including cargo, equipment, or hazardous substances. As new technologies and industries evolve, the new payload types may emerge, each with unique characteristics. As illustrated in FIG. 9, one example of the new threats may be unknown vessels 902, 904, 906, and 908 traversing waterways or maritime zones. These vessels 902, 904, 906, and 908 may include, but are not limited to, ships, boats, or other watercraft whose identities or intentions are not readily apparent.

Further, the AI model may be capable of dealing with the difficulties in identification of new environments. The new environments may include heavy rain and snow, dense fog and strong wind, visibility (line of sight), and range and sensor limitations. For brevity, some examples of new threats and new environments are, however the AI model may be capable of dealing with a wide range of new threats and new environments.

Figure 10:
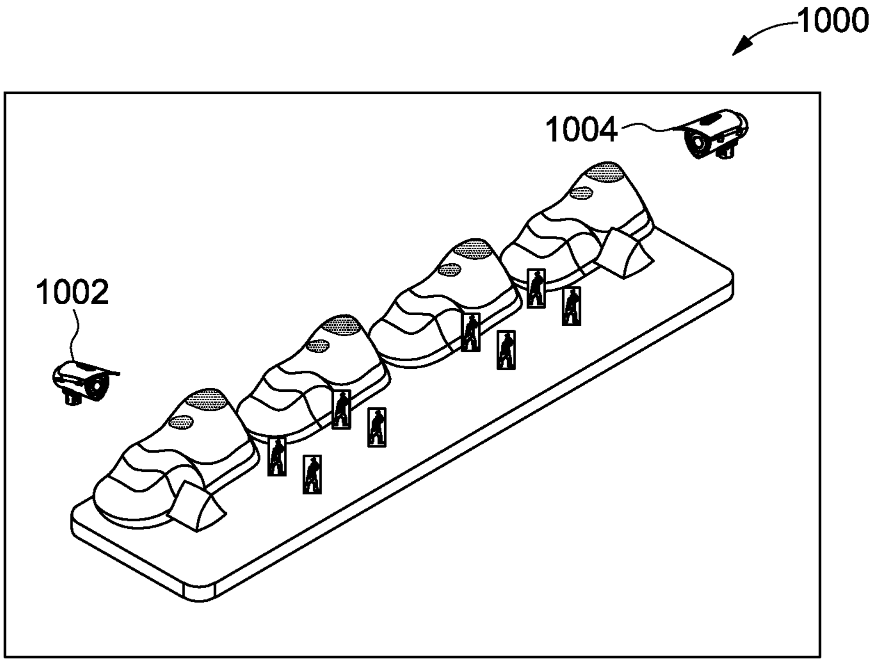
FIG. 10 illustrates an AI-based self-labeling in an exemplary border surveillance system, in accordance with some embodiments of the present disclosure.

Referring now to FIG. 10, an AI-based self-labeling in an exemplary border surveillance system 1000 is illustrated, in accordance with some embodiments of the present disclosure. FIG. 10 is explained in conjunction with FIGS. 1-9. The border surveillance system 1000 may employ an AI model (same as the AI model 216). The border surveillance system 1000 may include cameras 1002 and 1004 to capture various activities. The border surveillance system 1000 may swiftly and effectively detect both known and unknown emerging threats along borders and critical areas. It should be noted that a relevant label for an activity, an object, or an event may be identified from a plurality of pre-created labels. In case the relevant label is identified in the plurality of pre-created labels, the relevant label may be assigned to the activity, the object, or the event. Otherwise, a new label received from a user may be assigned. This (i.e., the new label and the corresponding activity, event, or object) may be learned by the border surveillance system 1000 temporarily. Further, if the same activity, the event, or the object is seen frequently, it may be learnt permanently.

The border surveillance system 1000 may leverage advanced surveillance technology, including, but not limited to, thermal imaging and motion sensors. As a result, the surveillance system 1000 may offer comprehensive monitoring capabilities to ensure enhanced safety and security. Further, the border surveillance system 1000 may detect emerging threats rapidly. For example, the border surveillance system 1000 may identify the threats in real-time whether it is unauthorized border crossings, suspicious activities, or potential security breaches. The border surveillance system 1000 may monitor large stretches of border territory, providing constant vigilance against intrusions or unlawful activities.

In some embodiments, the border surveillance system 1000 may help securing national borders against various threats and unauthorized activities. By way of an example, the border surveillance system 1000 may detect the threats and the unauthorized activities including perimeter intrusion, drifting and suspicious activity, concealed weapons, and cross-border movement. Additionally, in some embodiments, the border surveillance system 1000 may enhance security within military bases and other critical defense installations. For example, the border surveillance system 1000 may perform VIP vehicle identification, environmental hazard detection, tarmac, and sensitive area monitoring.

Moreover, the border surveillance system 1000 may help safeguard critical defense infrastructure and assets, particularly in strategic locations. For example, the border surveillance system 1000 may perform crowd formation analysis, movement pattern recognition, equipment and vehicle monitoring, and monitoring changes in environmental structures.

By way of an example, in some embodiments, the disclosure may be implemented in aerial reconnaissance and elimination systems (ARIES). In such a case, the ARIES may ensure comprehensive airspace security. The ARIES may provide advanced surveillance, threat prediction, and rapid response capabilities by detecting and tracking all airborne objects. The ARIES may also include ground-based systems for early warning and protection of military bases, government buildings, and airports against aerial threats. The ARIES may enhance security through advanced global defense strategies and border surveillance capabilities. For example, the ARIES may perform Unmanned Aerial Vehicle (UAV) detection, military aircraft monitoring, flight pattern analysis, real-time airspace mapping. Further, the ARIES may help Implement sophisticated safety measures and event management systems for urban environments and large-scale events. For example, the ARIES may perform object recognition, behavioral analysis, alert generation and threat prioritization, and the like. In some embodiments, the ARIES may analyze UAV patterns and formations to identify coordinated threats, enhancing situational awareness and countermeasure planning, for example by performing UAV pattern and formation analysis, providing enhanced situational awareness, identification of coordinated threats, and providing support in countermeasure planning.

By way of another example, in some embodiments, the disclosure may be implemented in Marine Reconnaissance Systems (MIRAS). The MIRAS may detect suspicious behaviors and focus on labeling of the suspicious behaviors and proactively alert against the suspicious behavior near coastal areas and water boundaries. The MIRAS may safeguard marine environments by tracking vessels and identifying critical threats, such as unknown vessels, fisherman vessels, ship traffic, and the like. The MIRAS may detect unknown vessels at sea to identify potentially illegal activities. The MIRAS help securing maritime borders and coastal areas against unauthorized activities, smuggling, and security threats through labelling of maritime intrusion detection, suspicious vessel tracking, underwater movement detection, and coastal activity analysis. Further, the MIRAS may ensure safety and security of commercial and military ports, including cargo and personnel movements through the labelling of vessel tracking monitoring, container and cargo inspection, unauthorized access reporting, and critical infrastructure and asset protection. Additionally in some embodiments, the MIRAS may identify and prevent illegal fishing activities, preserving marine ecosystems, and enforcing fishing regulations through unauthorized fishing vessel identification, overfishing activity monitoring, protected species and habitat surveillance, and cross-border fishing activity tracking. Further, the MIRAS may provide critical capabilities for search and rescue operations, enforce maritime laws, and support underwater archaeological research and exploration, ensuring legal compliance and safety at sea. For example, the MIRAS may perform search and rescue operations, maritime legal enforcement, and archaeological and historical research. Moreover, the MIRAS may safeguard marine ecosystems and focus on conducting environmental research, assessing climate change impacts, managing oil spill responses, and monitoring aquaculture through maritime environmental research, oil spill detection and response, climate change impact assessment, and aquaculture monitoring.

By way of an example, the disclosure may have a utility in Drone Reconnaissance and Observation System (DROS). The DROS may utilize drones to identify different concepts, such as people, vehicles, infrastructure etc., in optical and thermal modalities to provide actionable insights to law enforcement agencies. For example, the DROS may identify and label intrusion, violence and riot, suspicious vehicles and traffic. The DROS may identify objects of interest through drones. The DROS seamlessly integrates military-grade drones with optical and thermal capabilities. The DROS excels in detecting and labelling unknown objects, individuals, and vehicles, significantly enhancing situational awareness and operational effectiveness. The DROS is a cutting-edge solution that identifies potential threats in real-time, ensuring timely alerts to authorities. In some embodiments, the DROS may monitor urban environments for security and public safety through riot and disturbance monitoring, urban traffic analysis, public event surveillance, and critical infrastructure watch. The DROS may enhance law enforcement capabilities with advanced drone reconnaissance through crime scene analysis, suspect tracking and identification, covert surveillance operations, and emergency response coordination. Further, the DROS may provide strategic intelligence and environmental oversight using drone technology through geographical and environmental surveillance, border patrol and security, natural disaster assessment and response, and wildlife and environmental conservation.

By way of an example, the disclosure may have a utility in accident hotspot detection and self-labelling. The real-time driver alerts about accident-prone conditions may be enhanced with a self-learning capability to detect new curves, patterns, and evolving risk factors. The disclosure leverages real-time road condition data and historical incident analysis, continually adapting and updating its algorithms. This dynamic adaptation ensures that the driver receives the most relevant and timely warnings, tailored to constantly changing factors that contribute to accident risks on the road. The disclosure significantly boosts safety by proactively identifying and responding to new and emerging threats in driving environments.

Figure 11:
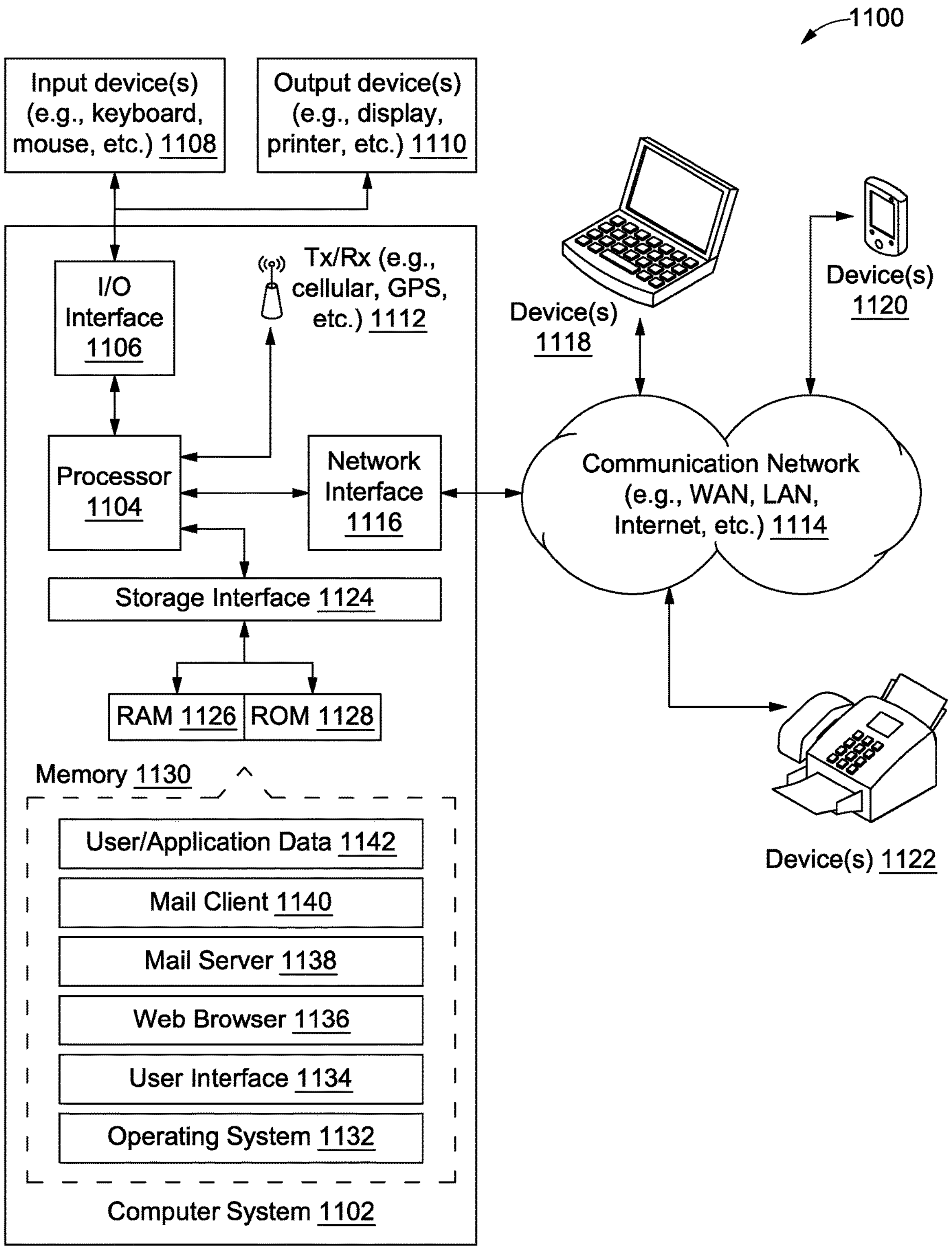
FIG. 11 illustrates a block diagram of an exemplary computer system for implementing embodiments consistent with the present disclosure.

Referring now to FIG. 11, a block diagram 1100 of an exemplary computer system 1102 for implementing various embodiments is illustrated. Computer system 1102 may include a central processing unit ('CPU' or 'processor') 1104. Processor 1104 may include at least one data processor for executing program components for executing user or system-generated requests. A user may include a person, a person using a device such as such as those included in this disclosure, or such a device itself. Processor 1104 may include specialized processing units such as integrated system (bus) controllers, memory management control units, floating point units, graphics processing units, digital signal processing units, etc. Processor 1104 may include a microprocessor, such as AMD® ATHLOM® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 1104 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1104 may be disposed in communication with one or more input/output (I/O) devices via an I/O interface 1106. I/O interface 1106 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 1002.n/b/g/n/x, Bluetooth, cellular (for example, code-division multiple access (CDMA), high-speed packet access (HSPA+), global system for mobile communications (GSM), long-term evolution (LTE), WiMAX, or the like), etc.

Using I/O interface 1106, computer system 1102 may communicate with one or more I/O devices. For example, an input device 1108 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 1110 may be a printer, fax machine, video display (for example, cathode ray tube (CRT), liquid crystal display (LCD), light-emitting diode (LED), plasma, or the like), audio speaker, etc. In some embodiments, a transceiver 1112 may be disposed in connection with processor 1104. Transceiver 1112 may facilitate various types of wireless transmission or reception. For example, transceiver 1112 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 1104 may be disposed in communication with a communication network 1114 via a network interface 1116. Network interface 1116 may communicate with communication network 1114. Network interface 1116 may employ connection protocols including, without limitation, direct connect, Ethernet (for example, twisted pair 10/100/1000 Base T), transmission control protocol/internet protocol (TCP/IP), token ring, IEEE 802.11a/b/g/n/x, etc. Communication network 1114 may include, without limitation, a direct interconnection, local area network (LAN), wide area network (WAN), wireless network (for example, using Wireless Application Protocol), the Internet, etc. Using network interface 1116 and communication network 1114, computer system 1102 may communicate with devices 1118, 1120, and 1122. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® reader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 1102 may itself embody one or more of these devices.

In some embodiments, processor 1104 may be disposed in communication with one or more memory devices (for example, RAM 1126, ROM 1128, etc.) via a storage interface 1124. Storage interface 1124 may connect to memory 1130 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 1130 may store a collection of program or database components, including, without limitation, an operating system 1132, user interface 1134, web browser 1136, mail server 1138, mail client 1140, user/application data 1142 (for example, any data variables or data records discussed in this disclosure), etc. Operating system 1132 may facilitate resource management and operation of computer system 1102. Examples of operating systems 1132 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 1134 may facilitate display, execution, interaction, manipulation, or operation of program components through textual or graphical facilities. For example, user interfaces may provide computer interaction interface elements on a display system operatively connected to computer system 1102, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 1102 may implement a web browser 1136 stored program component. Web browser 1136 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 1102 may implement a mail server 1138 stored program component. Mail server 1138 may be an Internet mail server such as MICROSOFT® EXCHANGE® mail server, or the like. Mail server 1138 may utilize facilities such as ASP, ActiveX, ANSI C++/C#, MICROSOFT.NET® programming language, CGI scripts, JAVA® programming language, JAVASCRIPT® programming language, PERL® programming language, PHP® programming language, PYTHON® programming language, WebObjects, etc. Mail server 1138 may utilize communication protocols such as internet message access protocol (IMAP), messaging application programming interface (MAPI), Microsoft Exchange, post office protocol (POP), simple mail transfer protocol (SMTP), or the like. In some embodiments, computer system 1102 may implement a mail client 1140 stored program component. Mail client 1140 may be a mail viewing application, such as APPLE MAIL® mail-client, MICROSOFT ENTOURAGE® mail client, MICROSOFT OUTLOOK® mail client, MOZILLA THUNDERBIRD® mail client, etc.

In some embodiments, computer system 1102 may store user/application data 1142, such as the data, variables, records, etc. as described in this disclosure. Such databases may be implemented as fault-tolerant, relational, scalable secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

The disclosure offers several advantages including an ability to generate image vectors in real-time from multimedia content captured via cameras, facilitating prompt responses to events or situations depicted in the multimedia content. Moreover, the disclosure includes automated categorization powered by a trained AI model. Further, the disclosure provides efficient identification of sets of image vectors associated with predefined categories of interest, streamlining a sorting process, and reducing manual effort. Additionally, the disclosure provides adaptive learning capability that ensures continuous improvement in classification accuracy over time, as it learns from user-assigned labels, thereby enhancing its responsiveness to evolving patterns and trends in data. Furthermore, the disclosure provides support for a diverse range of applications, as provided by the wide array of predefined categories of interest, underscores versatility and utility across various domains.

Another advantage lies in its hierarchical labeling structure, which allows for a nuanced and granular approach to categorization. This hierarchical framework enhances the ability to capture complex relationships and distinctions between different types of objects or events, thereby improving overall classification accuracy. Moreover, the disclosure provides determination of label availability through comparison of assigned dimensions and associated attributes ensures precise labeling of image vectors, minimizing misclassification errors and enhancing the reliability of the labeling process.

Additionally, the disclosure provides flexibility in integrating new labels with existing ones, whether as child labels or through the creation of updated labels, accommodates evolving data and user requirements, facilitating seamless expansion and refinement of the labeling system over time. Moreover, the inclusion of dimensions such as frequency, recency, and pattern provide a comprehensive framework for analyzing the multimedia content, enabling deeper insights into the temporal and contextual aspects of events depicted in the multimedia content.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. An Artificial Intelligence (AI) based self-labelling method comprising:

creating, in real-time, image vectors from multimedia content captured via a camera;

identifying, by a trained AI model, a set of image vectors associated with at least one predefined category of interest from the image vectors;

assigning at least one dimension to each of the set of image vectors;

determining, by the trained AI model, for a subset of image vectors within the set of image vectors, the availability of at least one relevant label from a plurality of pre-created labels, based on the at least one assigned dimension and associated attributes;

receiving, by the trained AI model, a user input for assigning a new label to the subset of image vectors, in response to determining non-availability of a relevant label from the plurality of pre-created labels; and performing, by the trained AI model, incremental learning based on the new label received from the user, wherein performing the incremental learning based on the new label comprises:

determining a similarity index for the new label relative to at least one of the plurality of pre-created labels;

merging the new label with a pre-created label from the plurality of pre-created labels, wherein the similarity index of the pre-created label relative to the new label is the highest.

2. The AI based self-labelling method of claim 1, wherein the predefined category of interest comprises at least one of a threat, debris, reconnaissance, surveillance, intrusion detection, intrusion elimination, unknown object detection, suspicious object detection swarm detection, payload analysis, accident investigation, anti-drone measures, environment monitoring, traffic monitoring, wildfire monitoring, flood monitoring, oil spill monitoring, urban planning, weapon detection, violence detection, agricultural monitoring, vessel classification, border monitoring, illegal activity detection, or danger.

3. The AI based self-labelling method of claim 1, wherein determining availability of the at least one relevant label comprises:

comparing the at least one assigned dimension and associated attributes for the subset of image vectors with dimensions and attributes of each of the plurality of pre-created labels; and identifying the at least one relevant label from the plurality of pre-created labels matching the at least one assigned dimension and associated attributes for the subset of image vectors.

4. The AI based self-labelling method of claim 1, wherein each of the plurality of pre-created labels comprises a multi-tiered hierarchy of child labels.

5. The AI based self-labelling method of claim 1, wherein merging the new label comprises adding the new label as a child label of the pre-created label.

6. The AI based self-labelling method of claim 1, wherein merging the new label comprises combing the new label with the pre-created label to create an updated label.

7. The AI based self-labelling method of claim 1, wherein the at least one dimension comprises a frequency dimension, a recency dimension, and a pattern dimension, and wherein:

the frequency dimension corresponds to frequency of occurrence of an event captured within the multimedia content;

the recency dimension corresponds to time-based proximity with a timestamp associated with the multimedia content; and the pattern dimension corresponds to a sequence of occurrences.

8. An Artificial Intelligence (AI) based self-labelling system comprising:

a processor; and a memory communicatively coupled to the processor, wherein the memory stores processor-executable instructions, which, on execution, causes the processor to:

create, in real-time, image vectors from multimedia content captured via a camera;

identify, by a trained AI model, a set of image vectors associated with at least one predefined category of interest from the image vectors;

assign at least one dimension to each of the set of image vectors;

determine, by the trained AI model, for a subset of image vectors within the set of image vectors, the availability of at least one relevant label from a plurality of pre-created labels, based on the at least one assigned dimension and associated attributes;

receive a user input to assign a new label to the subset of image vectors, in response to determining non-availability of a relevant label from the plurality of pre-created labels; and perform, by the trained AI model, incremental learning based on the new label received from the user, wherein the processor-executable instructions further cause the processor to perform the incremental learning based on the new label by:

determining a similarity index for the new label relative to at least one of the plurality of pre-created labels; and merging the new label with a pre-created label from the plurality of pre-created labels, wherein the similarity index of the pre-created label relative to the new label is the highest.

9. The AI based self-labelling system of claim 8, wherein the predefined category of interest comprises at least one of a threat, debris, reconnaissance, surveillance, intrusion detection, intrusion elimination, unknown object detection, suspicious object detection swarm detection, payload analysis, accident investigation, anti-drone measures, environment monitoring, traffic monitoring, wildfire monitoring, flood monitoring, oil spill monitoring, urban planning, weapon detection, violence detection, agricultural monitoring, vessel classification, border monitoring, illegal activity detection, or danger.

10. The AI based self-labelling system of claim 9, wherein the processor-executable instructions further cause the processor to determine availability of the at least one relevant label by:

comparing the at least one assigned dimension and associated attributes for the subset of image vectors with dimensions and attributes of each of the plurality of pre-created labels; and identifying the at least one relevant label from the plurality of pre-created labels matching the at least one assigned dimension and associated attributes for the subset of image vectors.

11. The AI based self-labelling system of claim 8, wherein each of the plurality of pre-created labels comprises a multi-tiered hierarchy of child labels.

12. The AI based self-labelling system of claim 8, wherein the processor-executable instructions further cause the processor to merge the new label by adding the new label as a child label of the pre-created label.

13. The AI based self-labelling system of claim 12, wherein the processor-executable instructions further cause the processor to merge the new label by combing the new label with the pre-created label to create an updated label.

14. The AI based self-labelling system of claim 11, wherein the at least one dimension comprises a frequency dimension, a recency dimension, and a pattern dimension, and wherein:

the frequency dimension corresponds to frequency of occurrence of an event captured within the multimedia content;

the recency dimension corresponds to time-based proximity with a timestamp associated with the multimedia content; and the pattern dimension corresponds to a sequence of occurrences.

15. A non-transitory computer-readable medium storing computer-executable instructions for Artificial Intelligence (AI) based self-labelling, the stored instructions, when executed by a processor, cause the processor to perform operations comprises:

creating, in real-time, image vectors from multimedia content captured via a camera;

identifying, by a trained AI model, a set of image vectors associated with at least one predefined category of interest from the image vectors;

assigning at least one dimension to each of the set of image vectors determining, by the trained AI model, for a subset of image vectors within the set of image vectors, the availability of at least one relevant label from a plurality of pre-created labels, based on the at least one assigned dimension and associated attributes;

receiving a user input for assigning a new label to the subset of image vectors, in response to determining non-availability of a relevant label from the plurality of pre-created labels; and performing, by the trained AI model, incremental learning based on the new label received from the user, wherein, to perform the incremental learning based on the new label, the computer-executable instructions further configured for:

determining a similarity index for the new label relative to at least one of the plurality of pre-created labels; and merging the new label with a pre-created label from the plurality of pre-created labels, wherein the similarity index of the pre-created label relative to the new label is the highest.

16. The non-transitory computer-readable medium of claim 15, wherein, to determine availability of the at least one relevant label, the computer-executable instructions further configured for:

comparing the at least one assigned dimension and associated attributes for the subset of image vectors with dimensions and attributes of each of the plurality of pre-created labels; and identifying the at least one relevant label from the plurality of pre-created labels matching the at least one assigned dimension and associated attributes for the subset of image vectors.

17. The non-transitory computer-readable medium of claim 15, wherein each of the plurality of pre-created labels comprises a multi-tiered hierarchy of child labels.

18. The non-transitory computer-readable medium of claim 15, wherein the at least one dimension comprises a frequency dimension, a recency dimension, and a pattern dimension, wherein:

the frequency dimension corresponds to frequency of occurrence of an event captured within the multimedia content;

the recency dimension corresponds to time-based proximity with a timestamp associated with the multimedia content; and the pattern dimension corresponds to a sequence of occurrences.

* * * * *